(12) United States Patent
Hikmet et al.

(10) Patent No.: US 9,733,416 B2
(45) Date of Patent: Aug. 15, 2017

(54) LIGHTING UNIT COMPRISING A WAVEGUIDE

(71) Applicant: PHILIPS LIGHTING HOLDING B.V., Eindhoven (NL)

(72) Inventors: Rifat Ata Mustafa Hikmet, Eindhoven (NL); Ties Van Bommel, Horst (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 162 days.

(21) Appl. No.: 14/356,409

(22) PCT Filed: Nov. 1, 2012

(86) PCT No.: PCT/IB2012/056090
§ 371 (c)(1),
(2) Date: May 6, 2014

(87) PCT Pub. No.: WO2013/068895
PCT Pub. Date: May 16, 2013

(65) Prior Publication Data
US 2014/0307466 A1    Oct. 16, 2014

Related U.S. Application Data

(60) Provisional application No. 61/556,866, filed on Nov. 8, 2011.

(51) Int. Cl.
*G02B 6/00* (2006.01)
*F21V 8/00* (2006.01)
*F21V 13/02* (2006.01)

(52) U.S. Cl.
CPC ............ *G02B 6/0063* (2013.01); *F21V 13/02* (2013.01); *G02B 6/005* (2013.01); *G02B 6/0055* (2013.01); *G02B 6/0058* (2013.01); *G02B 6/0065* (2013.01)

(58) Field of Classification Search
CPC .... G02B 6/0033; G02B 6/004; G02B 6/0043; G02B 6/0063; G02B 6/005; G02B 6/0058; F21V 13/02
USPC .................................................. 362/600–634
See application file for complete search history.

(56) References Cited

U.S. PATENT DOCUMENTS

| 7,991,257 B1* | 8/2011 | Coleman ............ B29D 11/0073 264/1.24 |
| 2003/0085642 A1 | 5/2003 | Pelka |
| 2005/0201102 A1 | 9/2005 | Saccomanno |
| 2006/0146573 A1* | 7/2006 | Iwauchi ............... G02B 6/0018 362/621 |

(Continued)

FOREIGN PATENT DOCUMENTS

| DE | 202010001155 U1 | 4/2010 |
| EP | 2447746 A1 | 5/2012 |

(Continued)

*Primary Examiner* — Diane Lee
*Assistant Examiner* — Gerald J Sufleta, II

(57) ABSTRACT

The invention provides a lighting unit comprising a waveguide for providing first light (111) having a first spectral distribution and second light (121) having a second spectral distribution emanating from a waveguide (100) in different directions, wherein the first spectral distribution and second spectral distribution differ. For instance, the first light (111) and the second light (121) have different color temperatures.

12 Claims, 7 Drawing Sheets

(56) References Cited

U.S. PATENT DOCUMENTS

| | | | |
|---|---|---|---|
| 2008/0084600 A1* | 4/2008 | Bita | G02B 6/0035 359/290 |
| 2009/0067194 A1 | 3/2009 | Sanchez | |
| 2009/0179548 A1 | 7/2009 | Lai | |
| 2010/0027293 A1* | 2/2010 | Li | G02B 6/002 362/619 |
| 2010/0177388 A1* | 7/2010 | Cohen | G02B 6/0038 359/566 |
| 2011/0096544 A1 | 4/2011 | Nakamura | |
| 2011/0199352 A1* | 8/2011 | Wheatley | G02B 6/0035 345/207 |
| 2011/0228193 A1* | 9/2011 | Shin | G02F 1/133606 349/61 |
| 2012/0118381 A1* | 5/2012 | Debije | G02B 6/004 136/259 |
| 2012/0140522 A1* | 6/2012 | Yagasaki | G02B 6/0058 362/625 |
| 2013/0021822 A1 | 1/2013 | Wimmer | |

FOREIGN PATENT DOCUMENTS

| | | |
|---|---|---|
| EP | 2476952 A2 | 7/2012 |
| JP | 2008147107 A | 6/2008 |
| JP | 3152908 U | 7/2009 |
| WO | 2011055847 A1 | 5/2011 |
| WO | 2011067719 A1 | 6/2011 |

\* cited by examiner

LIGHTING UNIT COMPRISING A WAVEGUIDE

CROSS-REFERENCE TO PRIOR APPLICATIONS

This application is the U.S. National Phase application under 35 U.S.C. §371 of International Application No. PCT/IB2012/056090, filed on Nov. 1, 2012, which claims the benefit of U.S. Provisional Patent Application No. 61/556,866, filed on Nov. 8, 2011. These applications are hereby incorporated by reference herein.

FIELD OF THE INVENTION

The invention relates to a lighting unit comprising a waveguide, as well as to a method for generating different types of light.

BACKGROUND OF THE INVENTION

Edge lit light guides and similar devices are known in the art. US 2011096570, for instance, describes an illumination device comprising a lighting unit. The lighting unit comprises a light source and a substantially flat light guide, arranged to collimate light source light. The light guide has an entrance window, an edge window, a first light guide surface, a second light guide surface, a first side edge and a second side edge. One or more of the first light guide surface and the second light guide surface comprise a plurality of grooves. In this way, latitudinal collimation is obtained.

SUMMARY OF THE INVENTION

A disadvantage of prior art systems is that those systems do not or do not easily allow the generation of beams of light with different optical properties, especially with different color temperature and CIE x,y-color point values (CIE 1931 XYZ color space, created by the International Commission on Illumination (CIE) in 1931).

Hence, it is an aspect of the invention to provide an alternative lighting unit and/or an alternative method using such lighting unit, which preferably further at least partly obviate one or more of above-described drawbacks.

In a first aspect, the invention provides a lighting unit comprising a waveguide, wherein the waveguide comprises a first light exit surface (herein also indicated as "first surface"), a second light exit surface (herein also indicated as "second surface") configured opposite of the first light exit surface, and an edge, the lighting unit further comprising (b) a light source, configured for lighting the waveguide with light source light, such as edge lighting the edge of the waveguide with light source light, thereby providing incoupled light source light, and a combination of one or more of a first luminescent material, a second luminescent material, a plurality of first reflectors and a plurality of second reflectors, to provide during operation (of the lighting unit) first light emanating from the lighting unit in a direction away from the first light exit surface and second light emanating from the lighting unit in a direction away from the second light exit surface, the first light having a first spectral distribution, the second light having a second spectral distribution, wherein the first spectral distribution and second spectral distribution differ.

Especially, the invention provides a lighting unit comprising (a) a waveguide, the waveguide comprising a first light exit surface, a second light exit surface configured opposite of the first light exit surface, and an edge, the lighting unit further comprising (b) a light source, configured for lighting (for instance the edge of) the waveguide with light source light, thereby providing (incoupled) light source light within the waveguide, wherein the lighting unit is further configured to allow part of the (incoupled) light source light escape from the waveguide at one or more of the first light exit surface and the second light exit surface as (outcoupled) light source light, wherein the lighting unit further comprises (c) one or more of a first luminescent material adjacent to the first light exit surface and configured to provide first luminescent material light, and a second luminescent material adjacent to the second light exit surface and configured to provide second luminescent material light, wherein the first luminescent material and the second luminescent material are excitable by the (outcoupled) light source light, wherein the lighting unit is configured to provide (during operation) first light emanating from the lighting unit in a direction away from the first light exit surface and second light emanating from the lighting unit in a direction away from the second light exit surface, the first light comprising contributions of one or more of (i) the (outcoupled) light source light and (ii) one or more of the first luminescent material light and the second luminescent material light, the second light comprising contributions of one or more of (iii) the (outcoupled) light source light and (iv) one or more of the first luminescent material light and the second luminescent material light, the first light having a first spectral distribution, the second light having a second spectral distribution, wherein the first spectral distribution and second spectral distribution differ.

Advantageously, this allows two different beams of light, directed in different directions, especially in opposite direction, having different spectral distributions. Especially, the first light and the second light may have different color temperatures. In an embodiment, the first light and the second light may (also) have different x,y color points. When light differs in color point or color temperature, the spectral distributions of the light differs per se. In an embodiment, wherein one or more of the first light and second light are composed of two or more color components, the first and second light may in an embodiment also differ in saturation of one or more of the colors of the color components.

The waveguide or light guide may especially be a transmissive plate. Especially, the plate is a massive (i.e. non-hollow) plate, of an organic or inorganic material. The organic material may for instance be selected from the group consisting of PE (polyethylene), PP (polypropylene), PEN (polyethylene napthalate), PC (polycarbonate), polymethylacrylate (PMA), polymethylmethacrylate (PMMA) (Plexiglas or Perspex), cellulose acetate butyrate (CAB), silicone, polyvinylchloride (PVC), polyethyleneterephthalate (PET), (PETG) (glycol modified polyethyleneterephthalate), PDMS (polydimethylsiloxane), and COC (cyclo olefin copolymer). Preferred inorganic materials are selected from the group consisting of glasses, (fused) quartz, and silicones. Especially preferred are PMMA, transparent PVC, or glass as material for the waveguide.

Especially, the waveguide has a rectangular cross section. In an embodiment, the waveguide cross section has a rectangular prism shape.

In an embodiment, light source light from the light source is coupled into the waveguide via an edge of the waveguide to provide (incoupled) light source light within the waveguide. In yet another embodiment, light source light from the light source is coupled into the waveguide via the first light exit surface (which has thereby also the function as light incoupling surface). In yet another embodiment, light source light from the light source is coupled into the waveguide via the second light exit surface (which has thereby also the function as light incoupling surface). In yet another embodimentlight source light from the light source is coupled into the waveguide via two or more of the first light exit surface, the second light exit surface, and the edge. As the edge may have a plurality of faces, like in general at least parallel arranged transverse edges (which may also be called front edge and back edge), the waveguide may also be edge-lighted from different directions, such as via the front edge and the back edge.

The term light source may in principle relate to any light source known in the art. Preferably, the light source is a light source that during operation emits at least light at a wavelength selected from the range of 200-490 nm, especially a light source that during operation emits at least light at wavelength selected from the range of 400-490 nm. This light may partially be used by the first and/or the second luminescent material (see below). In a specific embodiment, the light source comprises a solid state LED light source (such as a LED or laser diode). The term "light source" may also relate to a plurality of light sources, such as 2-20 (solid state) LED light sources.

The term white light herein, is known to the person skilled in the art. It especially relates to light having a correlated color temperature (CCT) between about 2000 and 20000 K, especially 2700-20000 K, for general lighting especially in the range of about 2700 K and 6500 K, and for backlighting purposes especially in the range of about 7000 K and 20000 K, and especially within about 15 SDCM (standard deviation of color matching) from the BBL (black body locus), especially within about 10 SDCM from the BBL, even more especially within about 5 SDCM from the BBL.

In an embodiment, the light source may also provide light source light having a correlated color temperature (CCT) between about 5000 and 20000 K, e.g. direct phosphor converted LEDs (blue light emitting diode with thin layer of phosphor for e.g. obtaining of 10000 K). Hence, in a specific embodiment the light source is configured to provide light source light with a correlated color temperature in the range of 5000-20000 K, even more especially in the range of 6000-20000 K, such as 8000-20000 K. An advantage of the relative high color temperature may be that there may be a relative high blue component in the light source light. This blue component may partially be absorbed by the first and/or the second luminescent materials and converted into luminescent material light. Hence, such light source light that has a (violet and/or) blue color component that may be used by the luminescent material to be excited. Light that is not absorbed by the luminescent material may escape from the waveguide via one or more of the first light exit face and second light exit face, dependent upon the specific configuration of luminescent material and reflectors. Optionally, a separate blue light source (such as a solid state LED) may be included in the light source.

The terms "violet light" or "violet emission" especially relates to light having a wavelength in the range of about 380-440 nm. The terms "blue light" or "blue emission" especially relates to light having a wavelength in the range of about 440-490 nm (including some violet and cyan hues). The terms "green light" or "green emission" especially relate to light having a wavelength in the range of about 490-560 nm. The terms "yellow light" or "yellow emission" especially relate to light having a wavelength in the range of about 560-590 nm. The terms "orange light" or "orange emission" especially relate to light having a wavelength in the range of about 590-620. The terms "red light" or "red emission" especially relate to light having a wavelength in the range of about 620-750 nm. The terms "visible", "visible light" or "visible emission" refer to light having a wavelength in the range of about 380-750 nm.

At least part of the light source light that is coupled into the waveguide, is also coupled out of the waveguide (see below). At least part of the outcoupled light may be converted by the first and/or the second luminescent materials.

The first and/or the second luminescent materials may in principle be any luminescent material that is suitable to absorb at least part of the light source light and is able to convert at least part of the absorbed light source light into luminescence (especially in the visible). Especially, the first and/or the second luminescent materials are configured to absorb at least part of the blue part of the light source light (assuming the light source light to comprise a blue light component).

Examples of inorganic luminescent material include, for example, cerium (Ce) doped Yttrium Aluminum Garnet (YAG), for instance in a molecular ratio of YAG:Ce of 2.1 or 3.3, or cerium doped Lutetium Aluminum Garnet (LuAG) (such as in a similar molecular ratio). Specific examples of suitable inorganic luminescent material are for instance $Y_3Al_5O_{12}:Ce^{3+}$, $Y_2LuAl_5O_{12}:Ce^{3+}$, $YGdTbAl_5O_{12}:Ce^{3+}$, $Y_{2.5}Lu_{0.5}Al_5O_{12}:Ce^{3+}$, $(Sr,Ba,Ca)_2SiO_4:Eu^{2+}$, $(Sr,Ca,Ba)Si_2O_2N_2:Eu^{2+}$, $(Ca,Sr,Ba)Ga_2S_4:Eu^{2+}$, $(Ca,Sr,Ba)_2Si_5N8:Eu^{2+}$, etc. Other blue light excitable luminescent material may be applied as well.

Alternatively or additionally, the first and/or the second luminescent materials comprise embedded organic luminescent materials. Examples of suitable organic luminescent materials include perylene derivatives, for example, BASF Lumogen®: such as F240 (orange), F305 (red), F083 (yellow), F170 (yellow), or combinations of two or more of such luminescent materials. Hence, in an embodiment the first and/or the second luminescent materials comprise a perylene luminescent material, such as one or more of the beforementioned perylene derivatives. Such luminescent materials may be embedded in a transparent material, such as one or more of the above or below indicated transparent materials.

In a specific embodiment, the first and/or the second luminescent material comprises luminescent quantum dots. Such luminescent material has the advantage of tunability of the emission band (dependent upon the particle size, as known in the art). Further, such systems may give saturated luminescence colors. Most known quantum dots with emission in the visible range are based on cadmium selenide (CdSe) with a shell such as cadmium sulfide (CdS) and (or) zinc sulfide (ZnS) shell. Cadmium free quantum dots, such as indium phosphode (InP), and/or copper indium sulfide ($CuInS_2$) and/or silver indium sulfide ($AgInS_2$) can also be used. Such luminescent materials may be embedded in a transparent material, such as one or more of the above or below indicated transparent materials.

In yet another embodiment, the first and/or the second luminescent materials comprise embedded micro particulate inorganic luminescent materials. Alternatively or additionally, the first and/or the second luminescent materials comprise embedded micro particulate organic luminescent materials. These particles may be embedded in an organic layer (support), such as an organic plate. A transparent material, such as one or more of the above or below indicated transparent materials, may be applied.

Examples of such supports wherein luminescent particles may be embedded in are transmissive organic material support, such as selected from the group consisting of PE (polyethylene), PP (polypropylene), PEN (polyethylene napthalate), PC (polycarbonate), polymethylacrylate (PMA), polymethylmethacrylate (PMMA) (Plexiglas or Perspex), cellulose acetate butyrate (CAB), silicone, polyvinylchloride (PVC), polyethyleneterephthalate (PET), (PETG) (glycol modified polyethyleneterephthalate), PDMS (polydimethylsiloxane), and COC (cyclo olefin copolymer). However, in another embodiment the sypport may comprise an inorganic material. Preferred inorganic materials are selected from the group consisting of glasses, (fused) quartz, transmissive ceramic materials, and silicones. Especially preferred are PMMA, transparent PVC, or glass as material for the support.

As indicated above, the first luminescent material and the second luminescent material are excitable by the (outcoupled) light source light. In case two (or more) different luminescent materials are present, optionally one luminescent material may be excited by the luminescence of the other luminescent material. Hence, in an embodiment, wherein both the first luminescent material and the second luminescent material are comprised by the lighting unit, the at least one of the first luminescent material and the second luminescent material are excitable by the (outcoupled) light source light, and the other luminescent material(s) may be excitable by either one or more of the (outcoupled) light source light and luminescence of by a luminescent material that is at least excitable by the (outcoupled) light source light. For instance, $Sr_2Si_5N_8:Eu^{2+}$ may both be excitable by a blue LED as light source and by emission from $YAG:Ce^{3+}$.

The lighting unit may comprise the first luminescent material, or the second luminescent material or both the first and the second luminescent material. The term luminescent material may also relate to a combination of different luminescent materials. The term "first luminescent material" and "second luminescent material" is used to distinguish between luminescent material adjacent to the first light exit surface and the second light exit surface, respectively. In an embodiment, those luminescent materials may be identical (but may in an embodiment be distributed differently over the first exit surface and second exit surface, see also below). In yet another embodiment, those luminescent materials are different (i.e. have different optical properties, such as different CIE x,y; see also above).

The first and/or the second luminescent materials are external from the waveguide. Herein, it is indicated that the luminescent material(s) are adjacent to the first or the second light exit surface. In an embodiment, the luminescent material, or at least the layer or domain comprising the luminescent material, is in physical contact with the first or the second light exit surface. In yet another embodiment, between the luminescent material and the first of second light exit surface, an optical element may be placed, such as a reflector. Such reflector may be used to block outcoupling of the light source light at specific positions at the first and/or the second light exit surface (see also below). Hence, the first reflectors (if applicable) may be adjacent to the first light exit surface. Likewise, Hence, the second reflectors (if applicable) may be adjacent to the second light exit surface In general, the shortest distance between the first or second luminescent material, or at least the shortest distance between the layer or domain comprising the luminescent material and the respective first or second light exit surface will be in the range of 0-15 mm, especially 0-5 mm. Hence, herein the term "adjacent" is being applied. The distance between the luminescent material, or at least the layer or domain comprising the luminescent material, and the respective surface will in general be equal to or smaller than 5 mm, such as equal to or smaller than 2 mm, like equal to or smaller than 1 mm. The same may apply when the luminescent material domains are between the light exit surface and the reflector.

In most of the described and claimed embodiment, the first light exit surface and/or the second light exit surface comprise a plurality of reflectors, which do not cover the entire first light exit surface and/or the second light exit surface, respectively. Especially, the plurality of reflectors may be diffuse reflective. This may both apply to the first reflectors and second reflectors. In a number of embodiments, further described below, the coverage of the first luminescent material domains and first reflectors of the first light exit surface 110 may for instance be in the range of 0.1-75% of the surface area, such as 1-50%. The coverage of the second luminescent material domains and second reflectors of the second light exit surface may for instance be in the range of 0.1-75% of the surface area, such as 1-50%. These conditions may also apply when only first reflectors or only first luminescent material domains are present adjacent to the first light exit surface, etc. the first reflectors, the second reflectors, the first luminescent material domains and the second luminescent material domains may for instance be as small as 0.1 mm$^2$ to for instance 100 cm$^2$.

Here, some options are listed how an light in different directions can be provided with different spectral distributions, see also below: in an embodiment, one or more of (a) the first light exit surface comprises a first luminescent material layer comprising the first luminescent material, and (b) the second light exit surface comprises a second luminescent material layer comprising the second luminescent material, and one or more of the following conditions apply: the first luminescent material layer and the second luminescent material layer differ in luminescent material, the first luminescent material layer and the second luminescent material layer differ in luminescent material distribution, the first luminescent material layer and the second luminescent material layer differ in luminescent material content, and the first luminescent material layer and the second luminescent material layer differ in layer thickness.

As indicated above, the lighting unit is configured to provide during operation first light emanating from the lighting unit in a direction away from the first light exit surface and second light emanating from the lighting unit in a direction away from the second light exit surface, the first light comprising contributions of one or more of (i) the (outcoupled) light source light and (ii) one or more of the first luminescent material light and the second luminescent material light, the second light comprising contributions of one or more of (iii) the (outcoupled) light source light and (iv) one or more of the first luminescent material light and the second luminescent material light, the first light having a first spectral distribution, the second light having a second spectral distribution, wherein the first spectral distribution and second spectral distribution differ.

Due to the presence of the luminescent material(s), the reflectors (see below), patterning of luminescent material(s), etc., different types of light may emanate in opposite directions from the waveguide. The light emanating from waveguide in a direction away from the first and second light exit surfaces may contain contributions (in different ratio's) of (outcoupled) light source light, first luminescent material light and second luminescent material light. For this reason, it is indicated that the first light comprises contributions of one or more of (i) the (outcoupled) light source light and (ii) one or more of the first luminescent material light and the second luminescent material light, the second light comprising contributions of one or more of (iii) the (outcoupled) light source light and (iv) one or more of the first luminescent material light and the second luminescent material light.

For instance, in an embodiment, the first light contains (outcoupled) light source light and second luminescent material light, providing for instance white light, and the second light only contains first luminescent material light, providing for instance yellow light. In this way, lighting unit may be provided, giving during operation of the lighting unit white light (for instance down lighting) and yellow light (for instance up lighting, for illuminating the ceiling).

Hence, the invention provides a lighting unit comprising a waveguide, wherein in opposite direction light may emanate from opposite parts of the waveguide, and wherein the light traveling in opposite directions away from the waveguide have different spectral distributions, such as different correlated color temperatures.

In an embodiment, the invention provides a lighting unit, such as described above, wherein the first light exit surface comprises a plurality of first luminescent material domains comprising the first luminescent material, which cover part of the first light exit surface, with downstream of each first luminescent material domain a first reflector, wherein the first luminescent material domains are configured to generate first luminescent material light, and wherein the first reflectors are configured to couple at least part of the first luminescent material light out of the waveguide in a direction away from the second light exit surface, wherein the second light exit surface comprises a plurality of second reflectors, which cover part of the second light exit surface, and which are configured to couple at least part of the (incoupled) light source light out of the waveguide as (outcoupled) light source light in a direction away from the first light exit surface.

In an embodiment, the invention provides a lighting unit, such as described above, wherein the first light exit surface comprises a plurality of first luminescent material domains comprising the first luminescent material, which cover part of the first light exit surface, with downstream of each first luminescent material domain a first reflector, wherein the first luminescent material domains are configured to generate first luminescent material light, and wherein the first reflectors are configured to couple at least part of the first luminescent material light out of the waveguide in a direction away from the second light exit surface, wherein the second light exit surface comprises a plurality of second luminescent material domains comprising the second luminescent material, which cover part of the second light exit surface, with downstream of each second luminescent material domain a second reflector, wherein the second luminescent material domains are configured to generate second luminescent material, wherein the second reflectors are configured to couple at least part of the second luminescent material light out of the waveguide in a direction away from the first light exit surface, and wherein the first light exit surface and second light exit surface differ in coverage with the first luminescent material domains and second luminescent material domains, respectively.

In an embodiment, the invention provides a lighting unit, such as described above, wherein the first light exit surface comprises a plurality of first luminescent material domains comprising the first luminescent material, which cover part of the first light exit surface, with downstream of each first luminescent material domain a first reflector, wherein the first luminescent material domains are configured to generate first luminescent material light, and wherein the first reflectors are configured to couple at least part of the first luminescent material light out of the waveguide in a direction away from the second light exit surface, wherein the second light exit surface comprises a plurality of second luminescent material domains comprising the second luminescent material, which cover part of the second light exit surface, with downstream of each second luminescent material domain a second reflector, wherein the second luminescent material domains are configured to generate second luminescent material, wherein the second reflectors are configured to couple at least part of the second luminescent material light out of the waveguide in a direction away from the first light exit surface, and wherein the first luminescent material domains and the second luminescent material domains differ in luminescent material.

In an embodiment, the invention provides a lighting unit, such as described above, wherein the first light exit surface comprises a plurality of first reflectors, which cover part of the first light exit surface, wherein the second light exit surface comprises a second luminescent material layer comprising the second luminescent material, which covers the second light exit surface, wherein the second luminescent material layer is configured to generate second luminescent material light, wherein the first reflectors are configured to direct at least part of the (incoupled) light source light to the second luminescent material layer and to provide (outcoupled) light source light at the second light exit surface, and wherein the second luminescent material layer is optionally transmissive for part of the (outcoupled) light source light.

In an embodiment, the invention provides a lighting unit, such as described above, wherein the first light exit surface comprises a plurality of first luminescent material domains comprising the first luminescent material, which cover part of the first light exit surface, with downstream of each first luminescent material domain a first reflector, wherein the first luminescent material domains are configured to generate first luminescent material light, wherein the second light exit surface comprises a second luminescent material layer comprising the second luminescent material, which covers the second light exit surface, wherein the second luminescent material layer is configured to generate second luminescent material light, wherein the first luminescent material domains and the first reflectors are configured to couple at least part of the first luminescent material light out of the waveguide in a direction away from the second light exit surface, and wherein the second luminescent material layer is transmissive for at least part of the first luminescent material light.

In an embodiment, the invention provides a lighting unit, such as described above, wherein the first light exit surface comprises a plurality of first reflectors, which cover part of the first light exit surface, wherein the lighting unit further comprises a first luminescent material layer comprising the first luminescent material configured downstream of the first light exit surface, wherein the first luminescent material layer is configured to generate first luminescent material light, and wherein the plurality of first reflectors are configured between the first light exit surface and the first luminescent material layer, wherein the second light exit surface comprises a plurality of second reflectors, which cover part of the second light exit surface, wherein the first reflectors are configured to couple at least part of the (incoupled) light source light out of the waveguide in a direction away from the second light exit surface, and wherein the second reflectors are configured to direct at least part of the (incoupled) light source light to the first luminescent material layer and to provide (outcoupled) light source light at the first light exit surface, and wherein the first luminescent material layer is optionally transmissive for part of the (outcoupled) light source light.

In an embodiment, the invention provides a lighting unit, such as described above, wherein the first light exit surface comprises a plurality of first reflectors, which cover part of the first light exit surface, wherein the lighting unit further comprises a first luminescent material layer comprising the first luminescent material configured downstream of the first light exit surface, wherein the first luminescent material layer is configured to generate first luminescent material light, and wherein the plurality of first reflectors are configured between the first light exit surface and the first luminescent material layer, wherein the second light exit surface comprises a plurality of second reflectors, which cover part of the second light exit surface, wherein the lighting unit further comprises a second luminescent material layer comprising the second luminescent material configured downstream of the second light exit surface, wherein the second luminescent material layer is configured to generate second luminescent material light, and wherein the plurality of second reflectors are configured between the second light exit surface and the second luminescent material layer, wherein the first reflectors are configured to direct at least part of the (incoupled) light source light to the second luminescent material layer and to provide (outcoupled) light source light at the second light exit surface, and wherein the second luminescent material layer is optionally transmissive for part of the (outcoupled) light source light, and wherein the second reflectors are configured to direct at least part of the (incoupled) light source light to the first luminescent material layer and to provide (outcoupled) light source light at the first light exit surface, and wherein the first luminescent material layer is optionally transmissive for part of the (outcoupled) light source light.

In an embodiment, the invention provides a lighting unit, such as described above, wherein the first light exit surface comprises a first luminescent material layer comprising the first luminescent material, which covers the first light exit surface, wherein the first luminescent material layer is configured to generate first luminescent material light, wherein the second light exit surface comprises a plurality of second reflectors, which cover part of the second light exit surface, wherein the lighting unit further comprises a second luminescent material layer comprising the second luminescent material configured downstream of the second light exit surface, wherein the second luminescent material layer is configured to generate second luminescent material light, and wherein the plurality of second reflectors are configured between the second light exit surface and the second luminescent material layer, wherein the second reflectors are configured to direct at least part of the (incoupled) light source light to the first luminescent material layer and to provide (outcoupled) light source light at the first light exit surface, and wherein the first luminescent material layer is optionally transmissive for part of the (outcoupled) light source light, and wherein the first luminescent material layer is configured to direct at least part of the (incoupled) light source light to the second luminescent material layer, and wherein the second luminescent material layer is optionally transmissive for part of the (incoupled) light source light.

In an embodiment, the invention provides a lighting unit, such as described above, wherein the first light exit surface comprises a plurality of first luminescent material domains comprising the first luminescent material and a plurality of first reflectors, wherein the first luminescent material domains and the plurality of first reflectors cover part of the first light exit surface, wherein the second light exit surface comprises a plurality of second luminescent material domains comprising the second luminescent material and a plurality of second reflectors, wherein the second luminescent material domains and the plurality of second reflectors cover part of the second light exit surface, wherein the lighting unit comprises first couples of first reflectors and second luminescent material domains, with for each first couple the first reflector and second luminescent material domain configured opposite of each other with the waveguide in between, and wherein the lighting unit comprises second couples of second reflectors and first luminescent material domains, with for each second couple the second reflector and first luminescent material domain configured opposite of each other with the waveguide in between).

In an embodiment, the invention provides a lighting unit, such as described above, wherein the first light exit surface comprises a plurality of first luminescent material domains comprising the first luminescent material, which cover part of the first light exit surface, with downstream of each first luminescent material domain a first reflector, wherein the first luminescent material domains are configured to generate first luminescent material light, wherein the second light exit surface comprises switchable luminescent layer system comprising a second luminescent material layer comprising the second luminescent material, which covers the second light exit surface, with downstream of the switchable luminescent layer system a plurality of second reflectors, which cover part of the switchable luminescent layer system, wherein the second luminescent material layer is configured to generate second luminescent material light, wherein the first luminescent material domains and the first reflectors are configured to couple at least part of the first luminescent material light out of the waveguide in a direction away from the second light exit surface, wherein the switchable luminescent layer system is transmissive for at least part of the first luminescent material light, and wherein the switchable luminescent layer system is switchable between a first state with a low intensity of the luminescent material light and a second state with a high intensity of the luminescent material light.

In an embodiment, the invention provides a lighting unit, such as described above, wherein the light source comprises a light emitting device and wherein the light source light comprises blue light. Optionally, the light source may be configured to provide white light, which comprises blue light (blue light component); the blue light may be used to excite the first luminescent material and/or second luminescent material (where applicable), when applying first luminescent material and/or second luminescent material (where applicable) that are configured to be able to be excited by blue light.

In yet a further aspect, the invention provides a method of providing first light having a first spectral distribution and second light having a second spectral distribution emanating from a waveguide in different directions, wherein the first spectral distribution and second spectral distribution differ, comprising providing a lighting unit as defined herein and introducing light source light in the waveguide (via for instance the edge) (i.e. coupling light source light into the waveguide, to provide incoupled light source light). Part of the incoupled light source light will escape from the waveguide and excite one or more of the first luminescent material and second luminescent material.

The terms "upstream" and "downstream" relate to an arrangement of items or features relative to the propagation of the light from a light generating means (here the especially the first light source), wherein relative to a first position within a beam of light from the light generating means, a second position in the beam of light closer to the light generating means is "upstream", and a third position within the beam of light further away from the light generating means is "downstream".

The term "substantially" herein, such as in "substantially all luminescence" or in "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices or apparatus herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention further applies to an apparatus or device comprising one or more of the characterizing features described in the description and/or shown in the attached drawings. The invention further pertains to a method or process comprising one or more of the characterising features described in the description and/or shown in the attached drawings.

The various aspects discussed in this patent can be combined in order to provide additional advantages. Furthermore, some of the features can form the basis for one or more divisional applications.

BRIEF DESCRIPTION OF THE DRAWINGS

Embodiments of the invention will now be described, by way of example only, with reference to the accompanying schematic drawings in which corresponding reference symbols indicate corresponding parts, and in which:

FIGS. 3a-3l schematically depict some embodiment of the lighting unit as described herein in more detail.

The drawings are not necessarily on scale.

DETAILED DESCRIPTION OF THE EMBODIMENTS

Figure 1:
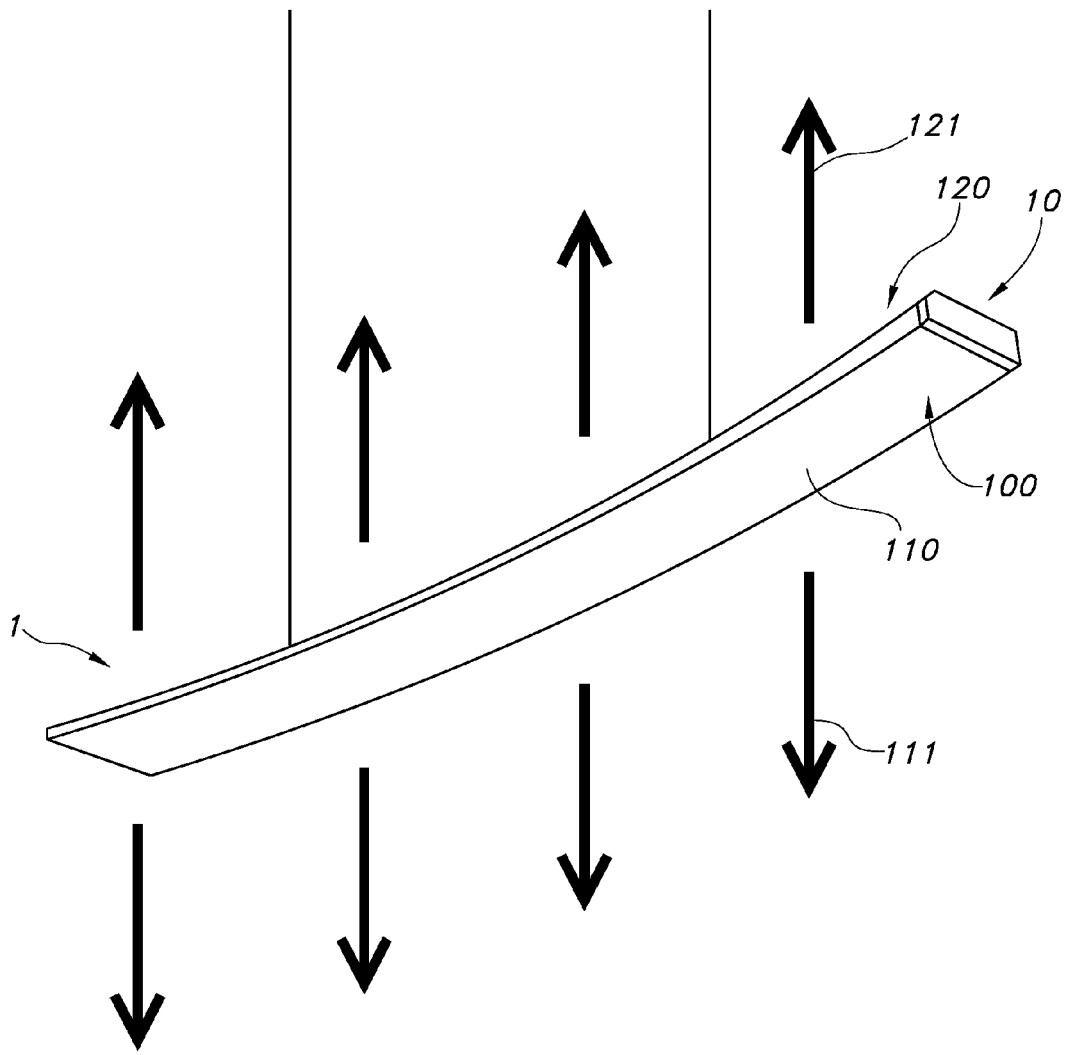
FIG. 1 schematically depicts an embodiment of the lighting unit.

FIG. 1 schematically depicts an embodiment of the lighting unit, indicated with reference 1. The lighting unit comprises a waveguide 100 with a first light exit surface 110, here the bottom surface or lower surface, and a second light exit surface 120, here the top or upper surface. In operation, light escapes in two opposite direction; in a direction away from the first light exit surface 110, indicated with first light 111, and in a direction away from the second light exit surface 120, indicated with second light 121. For instance, the first light 111 may have a higher color temperature than the second light 121.

Figure 2A:
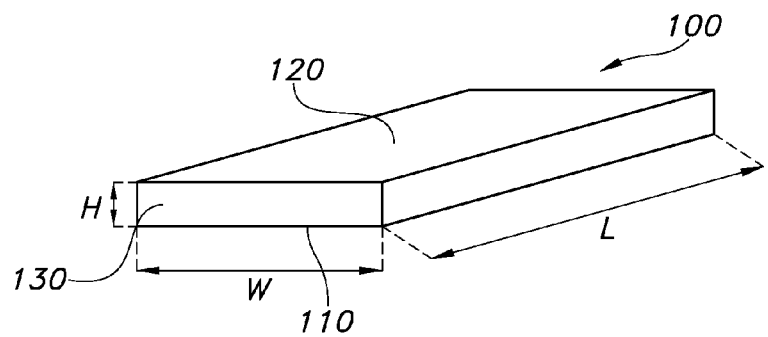
FIGS. 2a-2c schematically depicts some embodiments of the waveguide.
Figure 2B:
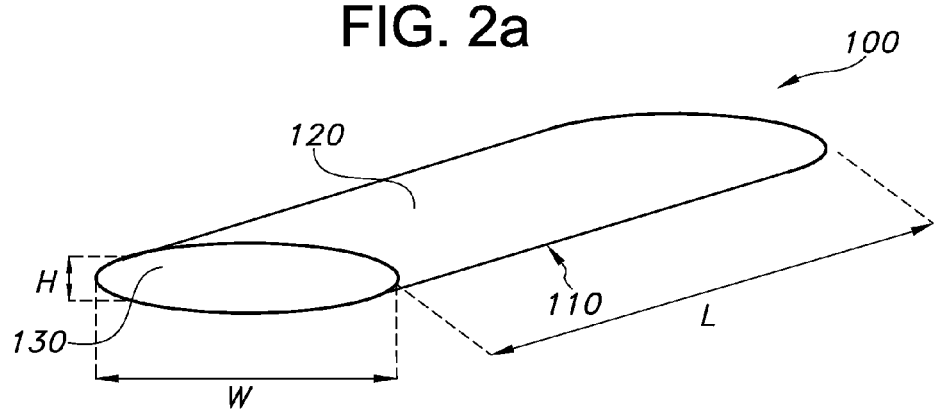

FIGS. 2a-2b schematically depicts a non-limiting number of embodiments of the waveguide. Other variants may be possible as well. The waveguide 100 has first light exit surface 110 and second light exit surface 120, opposite of the first light exit surface. In an embodiment, opposite may imply that a perpendicular to one surface will be also a perpendicular to the other surface. Further, the waveguide 100 has an edge 130, which bridges the first surface 110 and the second surface 120. The waveguide 100 (edge 130) has a height H. Further, the waveguide 100 has a length L and a width W. Especially, the ratios are H/L<1 and/or H/W<0.1. Further, preferably the ratio H/W<1. In a specific embodiment, the ratios are H/L<0.1 and/or H/W<0.1, such as ranges of 0.001-0.1 and 0.001-0.5, respectively. Preferably, the height H is in the range of 0.1 mm-10 mm.

Especially, the waveguide has a rectangular cross-section, with parallel longitudinal surfaces (which may also be called top and front face; but which are herein further indicated as first light exit surface and second light exit surface), parallel longitudinal edges (which may also be called side edges) and parallel transverse edges (which may also be called front and back edge), as schematically shown in FIG. 2a. Hence, in an embodiment, the waveguide 100 has a rectangular prism shape. However, one or more of those surfaces and edges may also be curved. In an embodiment, the waveguide may be a squar. In yet another embodiment, the waveguide has a round shape.

Herein, the waveguide is further indicated as having first light exit surface 110, second light exit surface 120 configured opposite of the first light exit surface 110, and edge 130. The latter is used for light incoupling of light of the light source (see below).

In a specific embodiment, the first light exit surface 110 and second light exit surface 120 are curved and bend to each other at the (longitudinal) edges, which may result in very thin (longitudinal) edges, as schematically depicted in FIG. 2b. Further or other curvatures than depicted in FIG. 2b may also be possible.

Especially, the waveguide 100 may comprise one or more planes of symmetry (not depicted).

Figure 2C:
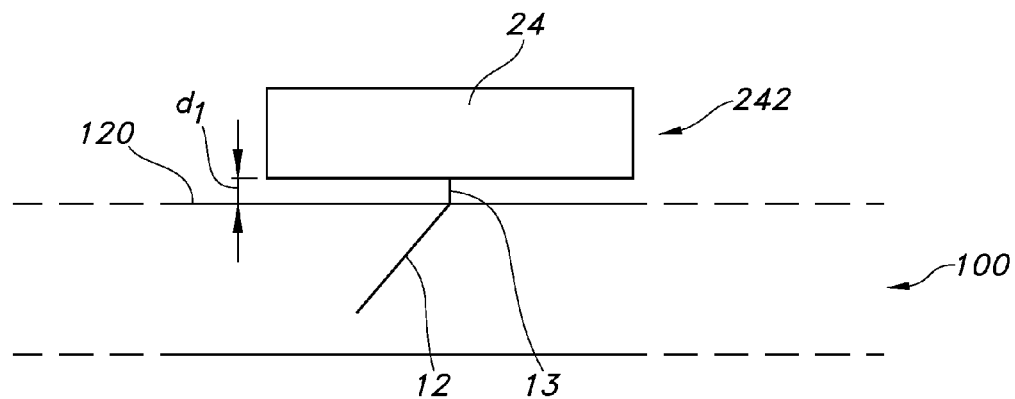

FIG. 2c schematically depicts an how light may travel. Incoupled light source light 12 may escape from the waveguide 100, as outcoupled light source light 13. It may for instance partly be absorbed by for luminescent material or reflected by a reflector (or escape to provide first light or second light). Here, by way of example the outcoupled light source light 13 impinges on second luminescent material domain 242 (see also below). Even when the distance between the second luminescent material domain and the second exit face 120 of waveguide is zero, light source light 13 may escape from the waveguide 100, produce luminescent material light (which may enter the waveguide). Likewise, this may apply when the outcoupled light source light 13 meets first material domain 142 or first reflector 151 or second reflector 152, etc.

FIG. 3a-3l schematically depicts embodiments of the lighting unit 1. The lighting unit 1 comprises waveguide 100, a light source 10, and one or more of a first luminescent material 14 and a second luminescent material 24. The waveguide 100 comprises first light exit surface 110, second light exit surface 120 configured opposite of the first light exit surface 110, and edge 130. The light source 10 is configured for lighting the waveguide 100 with light source light 11, thereby providing (incoupled) light source light 12 within the waveguide 100.

FIGS. 3a-3k show embodiments wherein the light source is configured for edge lighting the edge 130 of the waveguide 100 with light source light 11; FIG. 3l shows an embodiment wherein the light source 10 is configured for lighting the second exit surface 120 of the waveguide 100 with light source light 11 thereby providing (incoupled) light source light 12 within the waveguide 100. Note that in principle any of the embodiments schematically depicted in FIGS. 3a-3k may additionally or alternatively include a light source 10 configured for lighting one or more of the first light exit surface 110 and the second light exit surface 120 (and optionally also the edge 130). FIGS. 3a-3k show embodiments wherein only one edge 130 (here front edge) is illuminated. However, also the opposite edge (back edge) may be illuminated with light source light 11. Additionally or alternatively, also one or more of the longitudinal edges or side edges may be illuminated. The light source 10 is especially configured to provide (at least) blue light. For instance, a blue light emitting diode may be applied, but alternatively or additionally, a white light emitting diode may be applied, e.g. 6000 K light diode may be applied, when for instance a blue light emitting diode with thin layer of phosphor for is used.

The lighting unit 1 is further configured to allow part of the (incoupled) light source light 12 escape from the waveguide at one or more of the first light exit surface 110 and the second light exit surface 120 as (outcoupled) light source light 13. The first luminescent material 14 is adjacent to the first light exit surface 110 and is configured to provide first luminescent material light 141. The second luminescent material 24 is adjacent to the second light exit surface 120 and is configured to provide second luminescent material light 241. The first luminescent material 14 and the second luminescent material 24 are excitable by the (outcoupled) light source light 13.

The lighting unit 1 is configured to provide during operation first light 111 emanating from the lighting unit 1 in a direction away from the first light exit surface 110 and second light 121 emanating from the lighting unit 1 in a direction away from the second light exit surface 120. The first light 111 comprising contributions of one or more of (i) the (outcoupled) light source light 13 and (ii) one or more of the first luminescent material light 141 and the second luminescent material light 241. Also the second light 121 comprises contributions of one or more of (iii) the (outcoupled) light source light 13 and (iv) one or more of the first luminescent material light 141 and the second luminescent material light 241. The first light 111 has a first spectral distribution, the second light 121 has a second spectral distribution, wherein the first spectral distribution and second spectral distribution differ.

Figure 3A:
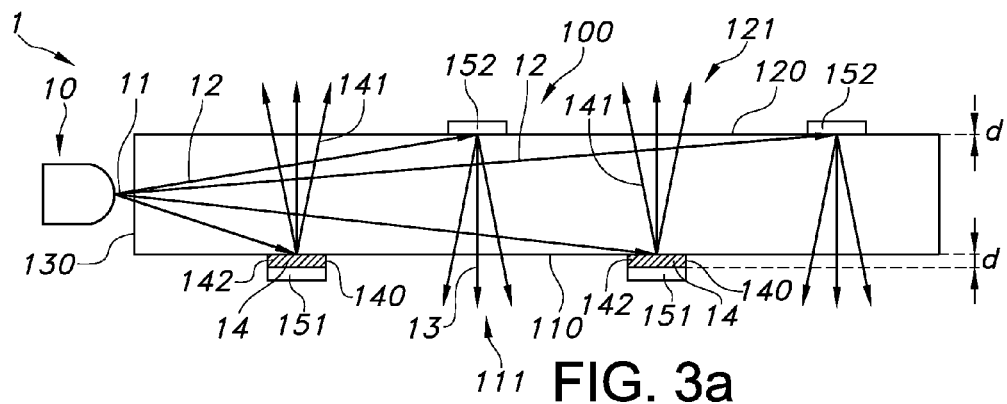

FIG. 3a schematically depicts an embodiment of the lighting unit 1, wherein the first light exit surface 110 comprises a plurality of first luminescent material domains 142 comprising the first luminescent material 14, which (domains 142) cover part of the first light exit surface 110. Downstream of each first luminescent material domain 142 a first reflector 151 is arranged. The first luminescent material domains 142 are configured to generate first luminescent material light 141. The first reflectors 151 are configured to couple at least part of the first luminescent material light 141 out of the waveguide 100 in a direction away from the second light exit surface 120. The second light exit surface 120 comprises a plurality of second reflectors 152, which cover part of the second light exit surface 120, and which are configured to couple at least part of the (incoupled) light source light 12 out of the waveguide 100 as (outcoupled) light source light 13 in a direction away from the first light exit surface 110.

The coverage of the first luminescent material domains 142 of the first light exit surface 110 surface may for instance be in the range of 0.1-75 of the surface area, such as 1-50%. Especially, first reflectors 151 cover the entire (respective) first luminescent material domains 142, but do not extend beyond the entire (respective) first luminescent material domains 142. The coverage of the second reflectors 152 of the second light exit surface 120 may for instance be in the range of 1-75% of the surface area, such as 2-50%.

In case only reflectors are used, such as in this embodiment reflectors 152 (reflectors 151 are accompanied with luminescent material domains 142) the reflective are preferably diffuse reflecting. In this way, light may be redirected to outer angles such that light escapes the total internal reflection (TIR) light path and is thus extracted from the light guide. This may also apply to the embodiments further described below.

Here, the first luminescent material domains 142 are in physical contact with the waveguide (here, adjacent is in physical contact), and the first reflectors 151 are close to the waveguide (here adjacent is close), with the first luminescent material domains 142 in between. The distance is indicated with d. As indicated above, d may for instance be in the range of 0-5 mm, such as equal to or smaller than 1 mm.

Hence, in a first embodiment, we suggest a waveguide comprising a plurality of first reflectors being arranged on a first side and a plurality of second reflectors containing a luminescent material being arranged on a second side. Using such configuration in combination with side-lit LEDs different colors and color temperatures can be produced in various directions.

In operation, light source light 11 enters via the edge 130 (or alternatively or additional via one or more of the first light exit surface 110 and the second light exit surface 120) of the waveguide 100 the waveguide, providing thereby (incoupled) light source light 12. Part of this (incoupled) light source light 12 is reflected via second reflectors 152 out of the waveguide 100 via first light exit surface 110, thereby providing first light 111, which may essentially consist of (outcoupled) light source light 13 (such as blue light when a blue light emitting diode is used or e.g. 6000 K light when for instance a blue light emitting diode with thin layer of phosphor for is used); part of this (incoupled) light source light 12 is converted by the first luminescent material domains 142 into first luminescent material light 141, and coupled out of the waveguide 100 via second light exit surface 120, thereby providing second light 121, which may essentially consist of first luminescent material light 141:

|  | Outcoupled light source light 13 | First luminescent material light 141 | Second luminescent material light 241 |
| --- | --- | --- | --- |
| First light 111 | X | — |  |
| Second light 121 |  | X | — |

Figure 3B:
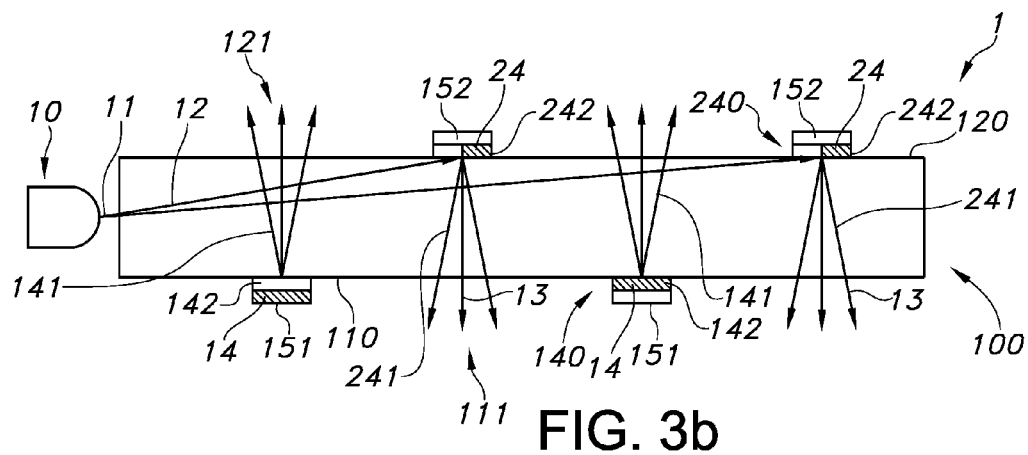

FIG. 3b schematically depicts an embodiment of the lighting unit 1, wherein the first light exit surface 110 comprises a plurality of first luminescent material domains 142 comprising the first luminescent material 14, which cover part of the first light exit surface 110, with downstream of each first luminescent material domain 142 a first reflector 151. The first luminescent material domains 142 are configured to generate first luminescent material light 141. The first reflectors 151 are configured to couple at least part of the first luminescent material light 141 out of the waveguide 100 in a direction away from the second light exit surface 120. The second light exit surface 120 comprises a plurality of second luminescent material domains 242 comprising the second luminescent material 24, which cover part of the second light exit surface 120, with downstream of each second luminescent material domain 242 a second reflector 152. The second luminescent material domains 242 are configured to generate second luminescent material 241. The second reflectors 152 are configured to couple at least part of the second luminescent material light 241 out of the waveguide 100 in a direction away from the first light exit surface 110. The first light exit surface 110 and second light exit surface 120 differ in coverage with the first luminescent material domains 142 and second luminescent material domains (242), respectively.

The coverage of the first luminescent material domains 142 of the first light exit surface 110 surface may for instance be in the range of 0.1-75% of the surface area, such as 1-50%. Especially, first reflectors 151 cover the entire (respective) first luminescent material domains 142, but do not extend beyond the entire (respective) first luminescent material domains 142. The coverage of the second luminescent material domains 242 of the second light exit 120 surface may for instance be in the range of 0.1-75% of the surface area, such as 1-50%. Especially, second reflectors 152 cover the entire (respective) second luminescent material domains 142, and may extend beyond the entire (respective) second luminescent material domains 142.

The coverage of the first light exit surface 110 with the first luminescent material domains 141 and the coverage of the second light exit surface 120 with the second luminescent material domains 241 differ. For instance, the ratio of the coverages may for instance be 2 or larger (or 0.5 and smaller).

In this embodiment, the first and second luminescent materials 14 and 24 are considered to be substantially identical. However, in a variant, they may also be different.

Hence, in a second embodiment, we suggest a waveguide comprising a plurality of first reflectors comprising a low concentration of luminescent material being arranged on a first side and a plurality of second reflectors containing a high concentration of luminescent material being arranged on a second side. This fig. shows an embodiment wherein the area of luminescent materials is varied.

In operation, light source light 11 enters via the edge 130 (or alternatively or additional via one or more of the first light exit surface 110 and the second light exit surface 120) of the waveguide 100 the waveguide, providing thereby (incoupled) light source light 12. Part of this (incoupled) light source light 12 is reflected via second reflectors 152 out of the waveguide 100 via first light exit surface 110, thereby providing first light 111, which may partly consist of (outcoupled) light source light 13 (such as blue light); part of this (incoupled) light source light 12 is converted by the second luminescent material domains 142 into second luminescent material light 241, and coupled out of the waveguide 100 via first light exit surface 110, thereby providing first light 111, which may partly consist of second luminescent material light 241; part of this (incoupled) light source light 12 is converted by the first luminescent material domains 142 into first luminescent material light 141, and coupled out of the waveguide 100 via second light exit surface 120, thereby providing second light 121, which may essentially consist of first luminescent material light 141:

|  | Outcoupled light source light 13 | First luminescent material light 141 | Second luminescent material light 241 |
| --- | --- | --- | --- |
| First light 111 | X |  | X |
| Second light 121 |  | X | — |

Figure 3C:
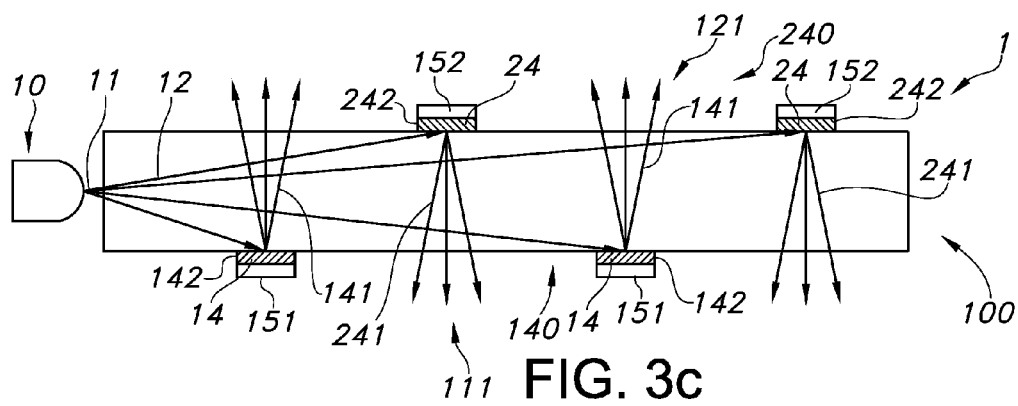

FIG. 3c schematically depicts an embodiment, wherein the first light exit surface 110 comprises a plurality of first luminescent material domains 142 comprising the first luminescent material 14, which cover part of the first light exit surface 110, with downstream of each first luminescent material domain 142 a first reflector 151. The first luminescent material domains 142 are configured to generate first luminescent material light 141. The first reflectors 151 are configured to couple at least part of the first luminescent material light 141 out of the waveguide 100 in a direction away from the second light exit surface 120. The second light exit surface 120 comprises a plurality of second luminescent material domains 242 comprising the second luminescent material 24, which cover part of the second light exit surface 120, with downstream of each second luminescent material domain 242 a second reflector 152. The second luminescent material domains 242 are configured to generate second luminescent material light 241. The second reflectors 152 are configured to couple at least part of the second luminescent material light 241 out of the waveguide 100 in a direction away from the first light exit surface 110. In this embodiment, the first luminescent material domains 142 and the second luminescent material domains 242 differ in luminescent material. This is also an example how different types of light in different direction can be generated.

The coverage of the first luminescent material domains 142 of the first light exit surface 110 surface may for instance be in the range of 0.1-75% of the surface area, such as 1-50%. Especially, first reflectors 151 cover the entire (respective) first luminescent material domains 142, but do not extend beyond the entire (respective) first luminescent material domains 142. The coverage of the second luminescent material domains 242 of the second light exit 120 surface may for instance be in the range of 0.1-75% of the surface area, such as 1-50%. Especially, second reflectors 152 cover the entire (respective) second luminescent material domains 142, but do not extend beyond the entire (respective) second luminescent material domains 142.

The coverage of the first light exit surface 110 with the first luminescent material domains 141 and the coverage of the second light exit surface 120 with the second luminescent material domains 241 are in this schematically depicted embodiment substantially identical, but may in an embodiment also differ.

In this embodiment, the first and second luminescent materials 14 and 24 are considered to be different. Unless indicated otherwise, the first luminescent material 14 and the second luminescent material 24 are different, i.e. provide different spectral distribution of the luminescence spectra under excitation with identical light. Examples of different luminescent materials are different perylene derivatives; however, even different activator concentration may already lead to different luminescent materials, as the luminescence spectra of YAG:Ce$^{3+}$ with 0.5 and 3 mol % may already differ from each other.

Hence, in another embodiment, we suggest a waveguide comprising a plurality of first reflectors comprising a first luminescent material being arranged on a first side and a plurality of second reflectors containing a second luminescent material being arranged on a second side.

In operation, light source light 11 enters via the edge 130 (or alternatively or additional via one or more of the first light exit surface 110 and the second light exit surface 120) of the waveguide 100 the waveguide, providing thereby (incoupled) light source light 12. Part of this (incoupled) light source light 12 is converted by the second luminescent material domains 142 into second luminescent material light 241, and coupled out of the waveguide 100 via first light exit surface 110, thereby providing first light 111, which may essentially consist of second luminescent material light 241; part of this (incoupled) light source light 12 is converted by the first luminescent material domains 142 into first luminescent material light 141, and coupled out of the waveguide 100 via second light exit surface 120, thereby providing second light 121, which may essentially consist of first luminescent material light 141:

|  | Outcoupled light source light 13 | First luminescent material light 141 | Second luminescent material light 241 |
|---|---|---|---|
| First light 111 |  |  | X |
| Second light 121 |  | X |  |

Figure 3D:
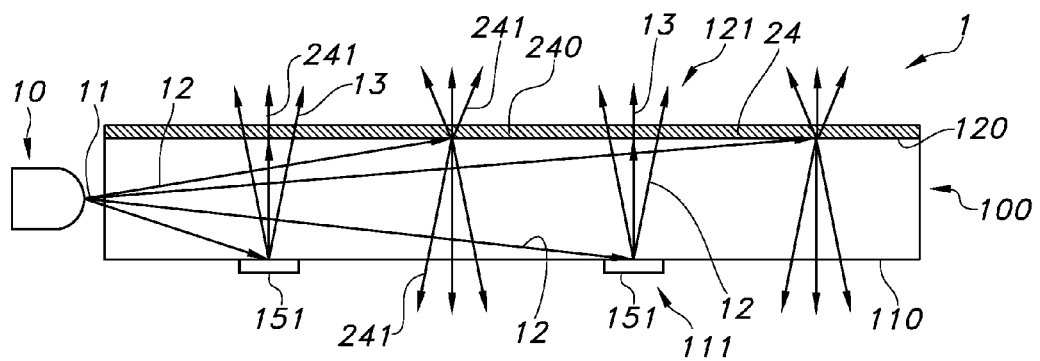

FIG. 3d schematically depicts an embodiment of the lighting unit 1, wherein the first light exit surface 110 comprises a plurality of first reflectors 151, which cover part of the first light exit surface 110. The second light exit surface 120 comprises a second luminescent material layer 240 comprising the second luminescent material 24, which covers the second light exit surface 120. The second luminescent material layer 240 is configured to generate second luminescent material light 241. The first reflectors 151 are configured to direct at least part of the (incoupled) light source light 12 to the second luminescent material layer 240 and to provide (outcoupled) light source light 13 at the second light exit surface 120. The second luminescent material layer 240 is optionally transmissive for part of the (outcoupled) light source light 13.

The coverage of the first reflectors 151 of the first light exit surface 110 may for instance be in the range of 0.1-75% of the surface area, such as 1-50%. The coverage of the second luminescent material layer 240 of the second light exit 120 may be substantially 100% of the surface area, such as at least 95%, especially at least 99%.

Hence, in another embodiment, we suggest a waveguide comprising a plurality of first reflectors being arranged on a first side and a luminescent layer being arranged on a second side.

In operation, light source light 11 enters via the edge 130 (or alternatively or additional via one or more of the first light exit surface 110 and the second light exit surface 120) of the waveguide 100 the waveguide, providing thereby (incoupled) light source light 12. Part of this (incoupled) light source light 12 is reflected via first reflectors 151 out of the waveguide 100 via second light exit surface 120, and is at least partly transmitted through the second luminescent material layer 240, thereby providing second light 121, which may partly consist of (outcoupled) light source light 13 (such as blue light); part of this (incoupled) light source light 12 is converted by the second luminescent material layer 240 into second luminescent material light 241, and coupled out of the waveguide 100 via first light exit surface 110, thereby providing first light 111, which may essentially consist of second luminescent material light 241; part of the second luminescent material light 241 may escape from the second luminescent material layer 240 in a direction away from the second surface 120, thereby providing second light 121, which may also partly consist of second luminescent material light 241:

|  | Outcoupled light source light 13 | First luminescent material light 141 | Second luminescent material light 241 |
|---|---|---|---|
| First light 111 |  | — | X |
| Second light 121 | X | — | X |

Figure 3E:
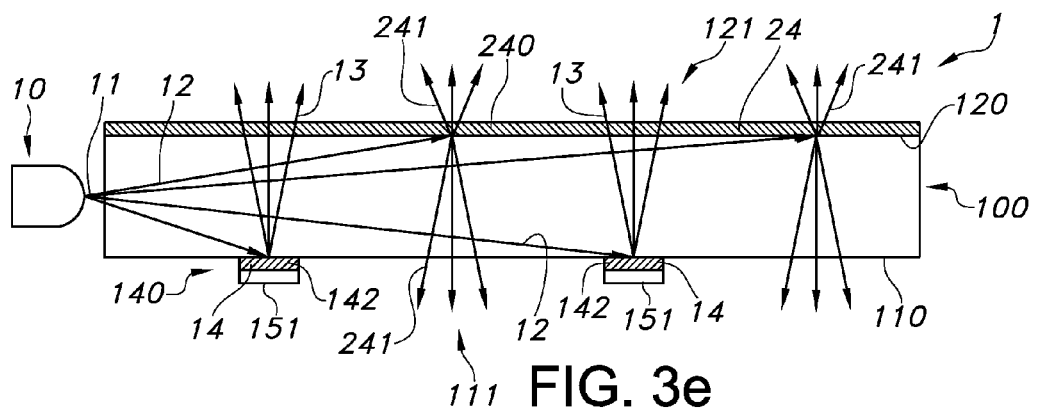

FIG. 3e schematically depicts an embodiment of the lighting unit 1, wherein the first light exit surface 110 comprises a plurality of first luminescent material domains 142 comprising the first luminescent material 14, which cover part of the first light exit surface 110, with downstream of each first luminescent material domain 142 a first reflector 151. The first luminescent material domains 142 are configured to generate first luminescent material light 141. The second light exit surface 120 comprises a second luminescent material layer 240 comprising the second luminescent material 24, which covers the second light exit surface 120. The second luminescent material layer 240 is configured to generate second luminescent material light 241. The first luminescent material domains 142 and the first reflectors 151 are configured to couple at least part of the first luminescent material light 141 out of the waveguide 100 in a direction away from the second light exit surface 120. The second luminescent material layer 240 is preferably transmissive for at least part of the first luminescent material light 141.

The coverage of the first luminescent material domains 142 of the first light exit surface 110 surface may for instance be in the range of 0.1-75% of the surface area, such as 1-50%. Especially, first reflectors 151 cover the entire (respective) first luminescent material domains 142, but do not extend beyond the entire (respective) first luminescent material domains 142. The coverage of the second luminescent material layer 240 of the second light exit 120 may be substantially 100% of the surface area, such as at least 95%, especially at least 99%. Especially, the first and second luminescent materials 14, 24 are different.

Note that in a specific embodiment, the second luminescent material 24 may be excitable also by the first luminescent material light 141. In a specific embodiment, instead of being excitable by the (outcoupled) light source light 13, the second luminescent material is excitable by the first luminescent material light 141.

Hence, in another embodiment, we suggest a waveguide comprising a plurality of first reflectors comprising luminescent material being arranged on a first side and a luminescent layer being arranged on a second side.

In operation, light source light 11 enters via the edge 130 (or alternatively or additional via one or more of the first light exit surface 110 and the second light exit surface 120) of the waveguide 100 the waveguide, providing thereby (incoupled) light source light 12. Part of this (incoupled) light source light 12 is converted by the first luminescent material domains 142 into first luminescent material light 141, and coupled out of the waveguide 100 via second light exit surface 120, and is at least partly transmitted through the second luminescent material layer 240, thereby providing second light 121, which may partly consist of first luminescent material light 141; part of this (incoupled) light source light 12 is converted by the second luminescent material layer 240 into second luminescent material light 241, and coupled out of the waveguide 100 via first light exit surface 110, thereby providing first light 111, which may essentially consist of second luminescent material light 241; part of the second luminescent material light 241 may escape from the second luminescent material layer 240 in a direction away from the second surface 120, thereby providing second light 121, which may also partly consist of second luminescent material light 241:

|  | Outcoupled light source light 13 | First luminescent material light 141 | Second luminescent material light 241 |
|---|---|---|---|
| First light 111 |  |  | X |
| Second light 121 |  | X | X |

Figure 3F:
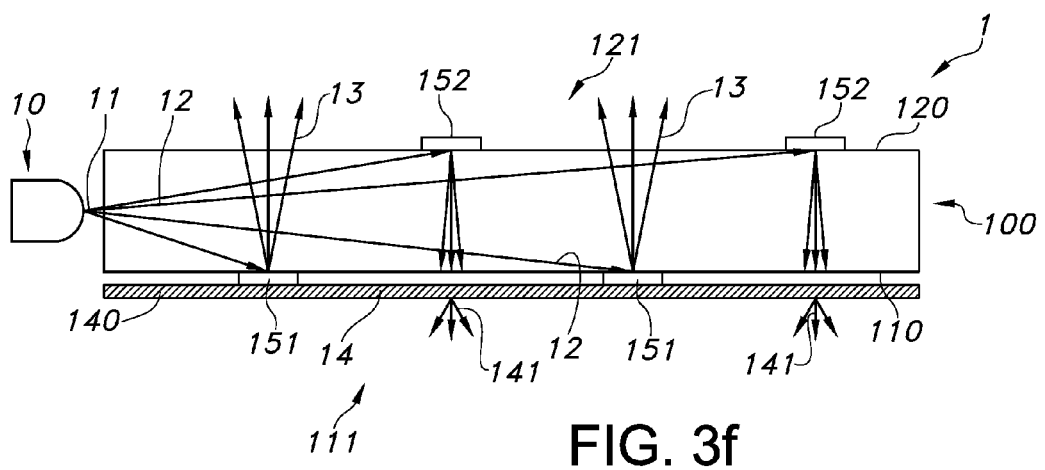

FIG. 3*f* schematically depicts an embodiment of the lighting unit 1, wherein the first light exit surface 110 comprises a plurality of first reflectors 151, which cover part of the first light exit surface 110. The lighting unit 1 further comprises a first luminescent material layer 140 (such as a foil), comprising the first luminescent material 14, configured downstream of the first light exit surface 110. The first luminescent material layer 140 is configured to generate first luminescent material light 141. The plurality of first reflectors 151 are configured between the first light exit surface 110 and the first luminescent material layer 140. The second light exit surface 120 comprises a plurality of second reflectors 151, which cover part of the second light exit surface 120. The first reflectors 151 are configured to couple at least part of the (incoupled) light source light 12 out of the waveguide 100 in a direction away from the second light exit surface 120. The second reflectors 152 are configured to direct at least part of the (incoupled) light source light 12 to the first luminescent material layer 140 and to provide (outcoupled) light source light 13 at the first light exit surface 110. The first luminescent material layer 140 is optionally transmissive for part of the (outcoupled) light source light 13.

The coverage of the first reflectors 151 of the first light exit surface 110 may for instance be in the range of 0.1-75% of the surface area, such as 1-50%. The coverage of the second reflectors 152 of the second light exit surface 120 may for instance be in the range of 0.1-75% of the surface area, such as 1-50%.

The "coverage" (it may be at some distance d from the first light exit surface 110) with the first luminescent material layer 140 of the first light exit surface 110 may be substantially 100% of the surface area, such as at least 95%, especially at least 99%.

Hence, in yet another embodiment, we suggest a waveguide comprising a plurality of first reflectors containing a luminescent foil being arranged on a first side and a plurality of second reflectors being arranged on a second side.

In operation, light source light 11 enters via the edge 130 (or alternatively or additional via one or more of the first light exit surface 110 and the second light exit surface 120) of the waveguide 100 the waveguide, providing thereby (incoupled) light source light 12. Part of this (incoupled) light source light 12 is reflected via first reflectors 151 out of the waveguide 100 via second light exit surface 120, thereby providing second light 121, which may essentially consist of (outcoupled) light source light 13 (such as blue light); part of this (incoupled) light source light 12 is reflected via second reflectors 152 out of the waveguide 100 via first light exit surface 110, and excites the first luminescent material 14 comprised by the first luminescent material layer 140, thereby providing first light 111, which may essentially consist of first luminescent material light 141, and optionally (outcoupled) light source light 13 (when the first luminescent material layer 141 is transmissive for this light):

|  | Outcoupled light source light 13 | First luminescent material light 141 | Second luminescent material light 241 |
|---|---|---|---|
| First light 111 |  | X | — |
| Second light 121 | X |  | — |

Figure 3G:
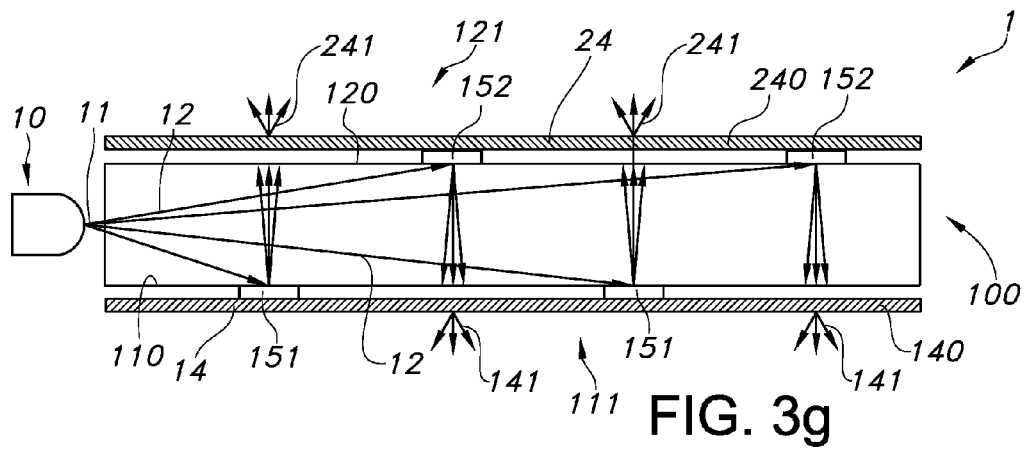

FIG. 3*g* schematically depicts an embodiment of the lighting unit 1, wherein the first light exit surface 110 comprises a plurality of first reflectors 151, which cover part of the first light exit surface 110. The lighting unit 1 further comprises a first luminescent material layer 140 (such as a foil) comprising the first luminescent material 14 configured downstream of the first light exit surface 110. The first luminescent material layer 140 is configured to generate first luminescent material light 141. The plurality of first reflectors 151 are configured between the first light exit surface 111 and the first luminescent material layer 140. The second light exit surface 120 comprises a plurality of second reflectors 152, which cover part of the second light exit surface 120. The lighting unit 1 further comprises a second luminescent material layer 240 (such as a foil) comprising the second luminescent material 24 configured downstream of the second light exit surface 120. The second luminescent material layer 240 is configured to generate second luminescent material light 241. The plurality of second reflectors 152 are configured between the second light exit surface 120 and the second luminescent material layer 240. The first reflectors 151 are configured to direct at least part of the (incoupled) light source light 12 to the second luminescent material layer 240 and to provide (outcoupled) light source light 13 at the second light exit surface 120. The second luminescent material layer 240 is optionally transmissive for part of the (outcoupled) light source light 13. The second reflectors 152 are configured to direct at least part of the (incoupled) light source light 12 to the first luminescent material layer 140 and to provide (outcoupled) light source light 13 at the first light exit surface 110. The first luminescent material layer 140 is optionally transmissive for part of the (outcoupled) light source light 13.

The coverage of the first reflectors 151 of the first light exit surface 110 may for instance be in the range of 0.1-75% of the surface area, such as 1-50%. The coverage of the second reflectors 152 of the second light exit surface 120 may for instance be in the range of 0.1-75% of the surface area, such as 1-50%.

The "coverage" (it may be at some distance d from the first light exit surface 110) with the first luminescent material layer 140 of the first light exit surface 110 may be substantially 100% of the surface area, such as at least 95%, especially at least 99%. The "coverage" (it may be at some distance d from the second light exit surface 120) with the second luminescent material layer 240 of the second light exit surface 120 may be substantially 100% of the surface area, such as at least 95%, especially at least 99%.

Hence, in yet another embodiment, we suggest a waveguide comprising a plurality of first reflectors containing a luminescent foil being arranged on a first side and a plurality of second reflectors containing a second luminescent foil being arranged on a second side.

In operation, light source light 11 enters via the edge 130 (or alternatively or additional via one or more of the first light exit surface 110 and the second light exit surface 120) of the waveguide 100 the waveguide, providing thereby (incoupled) light source light 12. Part of this (incoupled) light source light 12 is reflected via first reflectors 151 out of the waveguide 100 via second light exit surface 120, and excites the second luminescent material 24 comprised by the second luminescent material layer 240, thereby providing second light 121, which may essentially consist of second luminescent material light 241, and optionally (outcoupled) light source light 13 (when the second luminescent material layer 241 is transmissive for this light); part of this (incoupled) light source light 12 is reflected via second reflectors 152 out of the waveguide 100 via first light exit surface 110, and excites the first luminescent material 14 comprised by the first luminescent material layer 140, thereby providing first light 111, which may essentially consist of first luminescent material light 141, and optionally (outcoupled) light source light 13 (when the first luminescent material layer 141 is transmissive for this light):

|  | Outcoupled light source light 13 | First luminescent material light 141 | Second luminescent material light 241 |
|---|---|---|---|
| First light 111 |  | X |  |
| Second light 121 |  |  | X |

Figure 3H:
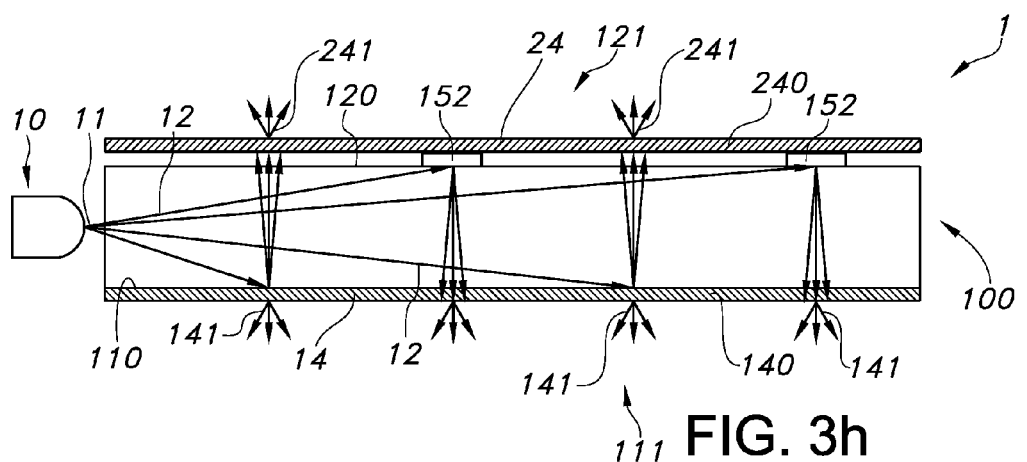

FIG. 3h schematically depicts an embodiment of the lighting unit 1, wherein the first light exit surface 110 comprises a first luminescent material layer 140 comprising the first luminescent material 14, which covers the first light exit surface 110. The first luminescent material layer 140 is configured to generate first luminescent material light 141. The second light exit surface 120 comprises a plurality of second reflectors 152, which cover part of the second light exit surface 120. The lighting unit 1 further comprises a second luminescent material layer 240, comprising the second luminescent material 24, configured downstream of the second light exit surface 120. The second luminescent material layer 240 is configured to generate second luminescent material light 241. The plurality of second reflectors 152 are configured between the second light exit surface 120 and the second luminescent material layer 240. The second reflectors 152 are configured to direct at least part of the (incoupled) light source light 12 to the first luminescent material layer 140 (and to provide (outcoupled) light source light 13 at the first light exit surface 110; the first luminescent material layer 140 is optionally transmissive for part of the (outcoupled) light source light 13). The first luminescent material layer 140 is configured to direct at least part of the (incoupled) light source light 12 to the second luminescent material layer 240 (the second luminescent material layer 240 is optionally transmissive for part of the (incoupled) light source light 12).

The coverage of the first luminescent material layer 140 of the first light exit surface 110 may be substantially 100% of the surface area, such as at least 95%, especially at least 99%. The coverage of the second reflectors 152 of the second light exit surface 120 may for instance be in the range of 0.1-75% of the surface area, such as 1-50%.

The "coverage" (it may be at some distance d from the second light exit surface 120) with the second luminescent material layer 240 of the second light exit surface 120 may be substantially 100% of the surface area, such as at least 95%, especially at least 99%.

Hence, in yet another embodiment, we suggest a waveguide comprising a first luminescent foil being arranged on a first side and a plurality of second reflectors containing a second luminescent foil being arranged on a second side.

In operation, light source light 11 enters via the edge 130 (or alternatively or additional via one or more of the first light exit surface 110 and the second light exit surface 120) of the waveguide 100 the waveguide, providing thereby (incoupled) light source light 12. Part of this (incoupled) light source light 12, couples out as (outcoupled) light source light 13 at the first light exit surface 110, is reflected at the first luminescent material layer 140 and coupled out of the waveguide 100 via second light exit surface 120, and excites the second luminescent material 24 comprised by the second luminescent material layer 240, thereby providing second light 121, which may essentially consist of second luminescent material light 241; alternatively or additionally, part of this (incoupled) light source light 12, couples out as (outcoupled) light source light 13 at the first light exit surface 110, and generates first luminescent material light 141, which may travel in the direction of the second light exit surface 120, coupled out of the waveguide 100 via second light exit surface 120, and (i) excites the second luminescent material 24 comprised by the second luminescent material layer 240, thereby providing second light 121, which may at least partly consist of second luminescent material light 241, and/or (ii) may be transmitted through the second luminescent material layer 240, thereby providing second light 121, which may at least partly also consist of first luminescent material light 141; part of this (incoupled) light source light 12 is reflected via second reflectors 152 out of the waveguide 100 via first light exit surface 110, and excites the first luminescent material 14 comprised by the first luminescent material layer 140, thereby providing first light 111, which may essentially consist of first luminescent material light 141, and optionally (outcoupled) light source light 13 (when the first luminescent material layer 141 is transmissive for this light):

| | Outcoupled light source light 13 | First luminescent material light 141 | Second luminescent material light 241 |
|---|---|---|---|
| First light 111 | | X | |
| Second light 121 | | | X |

Figure 3I:
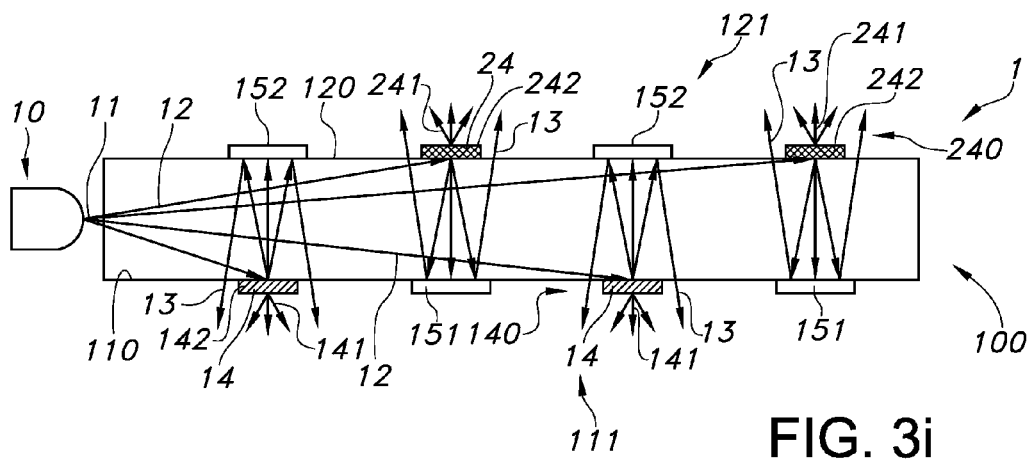

FIG. 3i schematically depicts an embodiment of the lighting unit 1, wherein the first light exit surface 110 comprises a plurality of first luminescent material domains 142 comprising the first luminescent material 14 and a plurality of first reflectors 151, wherein the first luminescent material domains 142 and the plurality of first reflectors 151 cover part of the first light exit surface 110. The second light exit surface 120 comprises a plurality of second luminescent material domains 242 comprising the second luminescent material 24 and a plurality of second reflectors 152, wherein the second luminescent material domains 242 and the plurality of second reflectors 152 cover part of the second light exit surface 120. The lighting unit 1 comprises first couples 31 of first reflectors 151 and second luminescent material domains 242, with for each first couple 31 the first reflector 151 and second luminescent material domain 242 configured opposite of each other with the waveguide 100 in between. The lighting unit 1 comprises alternatively or additionally second couples 32 of second reflectors 152 and first luminescent material domains 142, with for each second couple 32 the second reflector 152 and first luminescent material domain 142 configured opposite of each other with the waveguide 100 in between.

The coverage of the first luminescent material domains 142 and first reflectors 151 of the first light exit surface 110 may for instance be in the range of 0.1-75% of the surface area, such as 1-50%. The coverage of the second luminescent material domains 242 and second reflectors 152 of the second light exit surface 120 may for instance be in the range of 0.1-75% of the surface area, such as 1-50%.

In a specific embodiment, as depicted here, the surface area occupied by an opposite domain in a couple is smaller than the surface area occupied by the accompanying (opposite) reflector.

Hence, in yet another embodiment, we suggest a waveguide comprising a plurality of first reflectors being arranged on a first side aligned with luminescent dots being arranged on a second side and a plurality of second reflectors being arranged on a second side aligned with luminescent dots being arranged on a first side.

In operation, light source light 11 enters via the edge 130 (or alternatively or additional via one or more of the first light exit surface 110 and the second light exit surface 120) of the waveguide 100 the waveguide, providing thereby (incoupled) light source light 12.

Part of this (incoupled) light source light 12 is reflected via first reflectors 151 out of the waveguide 100 via second light exit surface 120, and at least partially excites the second luminescent material 24 to provide first luminescent material light 241, part of this second luminescent material light 241 may travel in a direction away from the second light exit surface 120, thereby providing second light 121, which may essentially consist of second luminescent material light 241; part of this second luminescent material light 241 may travel in a direction of the first light exit surface 110, and escape from the waveguide 100, but may at least partly be reflected by the first reflectors 151, in a direction of the second light exit surface 120, thereby further contributing to the second light 121. This relates to a first couple 31.

Part of this (incoupled) light source light 12 is reflected via second reflectors 152 out of the waveguide 100 via first light exit surface 110, and at least partially excites the first luminescent material 14 to provide first luminescent material light 141, part of this first luminescent material light may travel in a direction away from the first light exit surface 110, thereby providing first light 111, which may essentially consist of first luminescent material light; part of this first luminescent material light may travel in a direction of the second light exit surface 120, and escape from the waveguide 100, but may at least partly be reflected by the second reflectors 152, in a direction of the first light exit surface 110, thereby further contributing to the first light 111. This relates to a second couple 32. Hence, the following may be obtained:

| | Outcoupled light source light 13 | First luminescent material light 141 | Second luminescent material light 241 |
|---|---|---|---|
| First light 111 | | X | |
| Second light 121 | | | X |

Configurations suggested here above contain a plurality of reflectors. In yet further embodiment, we suggest the use of other light extraction structures such as gratings, refractive structures, and translucent scattering dots. For instance, we suggest a waveguide comprising a plurality of first reflectors being arranged on a first side aligned with luminescent dots being arranged on a second side and a plurality of roughened surface areas being arranged on a first side.

Figure 3J:
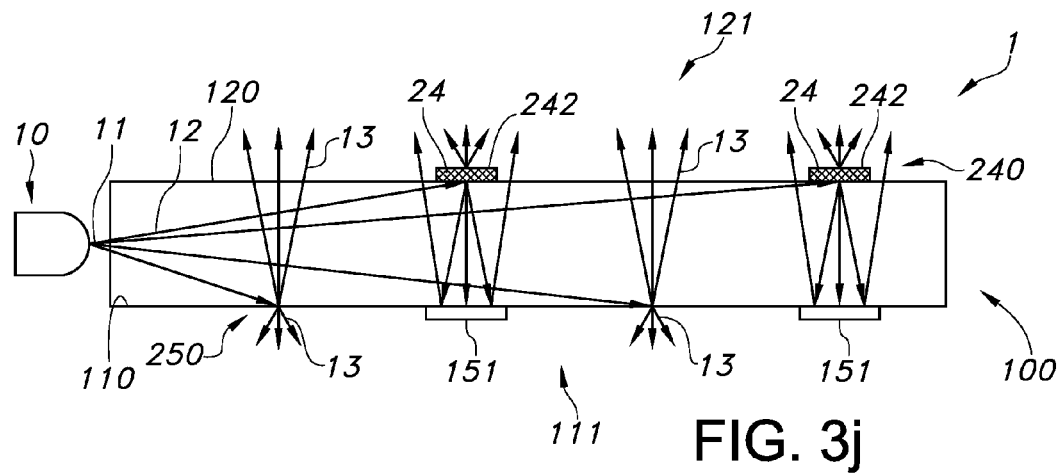

FIG. 3j, for instance, shows an embodiment of the lighting unit 1, wherein the first surface 110 of the waveguide 100 further comprises an alternative reflective structure 250, here comprising surface roughening(s).

In an embodiment, one or more the first reflectors (if present) and one or more of the second reflectors (if present) are specular reflective reflectors. Optionally or additionally, one or more the first reflectors (if present) and one or more of the second reflectors (if present) are diffuse reflective reflectors. For instance, one or more the first reflectors (if present) and one or more of the second reflectors (if present) comprise reflectors selected from the group consisting of gratings, refractive structures, surface roughening and scattering dots. Such reflectors may be applied on or integrated in the light exit surface(s).

Especially, one or more the first reflectors (if present) and one or more of the second reflectors (if present) comprise (a) reflectors selected from the group consisting of mirrors, gratings, and refractive structures, and (b) optionally one or more reflectors selected from the group consisting of surface roughening and scattering dots.

In an embodiment, one or more the first reflectors (if present) and one or more of the second reflectors (if present) comprise may be configured to transmit part of the light (such as (outcoupled) light source light 13) and to reflect part of the light (such as (outcoupled) light source light 13). Such type of reflector is shown in FIG. 3j as alternative reflective structure 250. As indicated above, preferably and one or more of the second reflectors (if present) comprise reflectors selected from the group consisting of mirrors, gratings, and refractive structures.

Figure 3K:
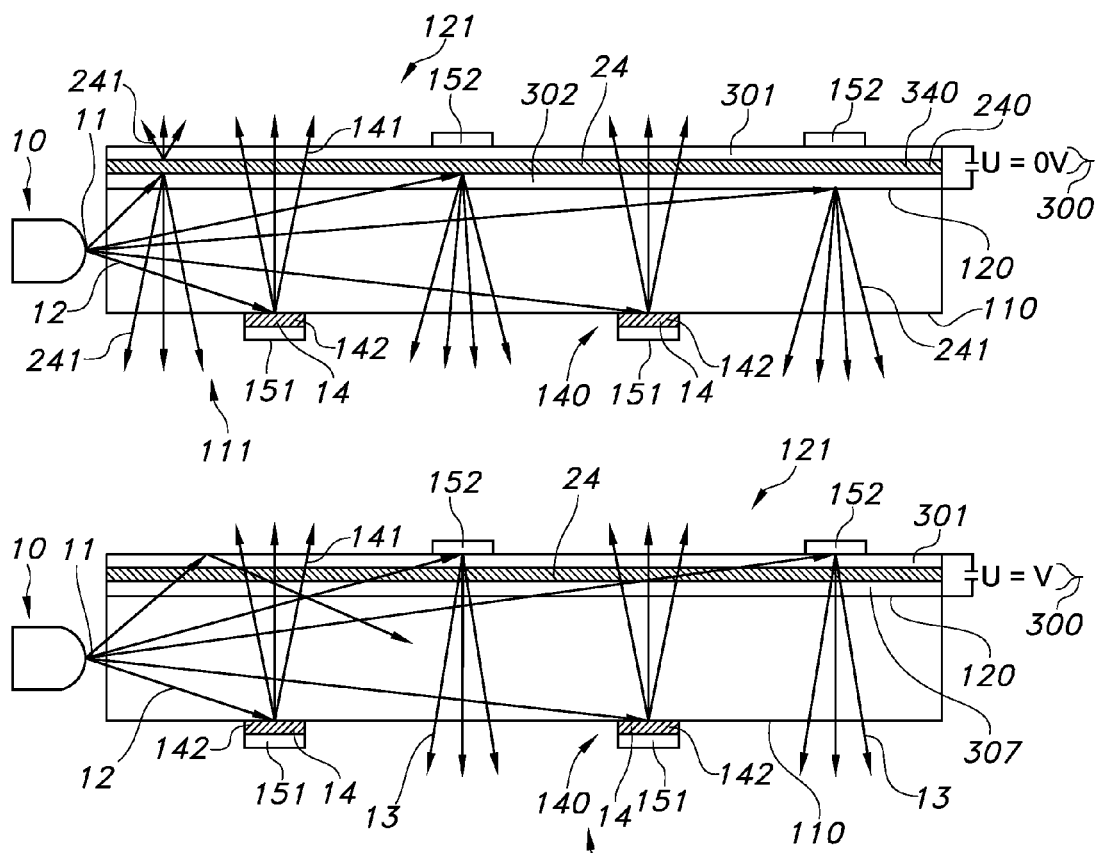
Figure 3I:
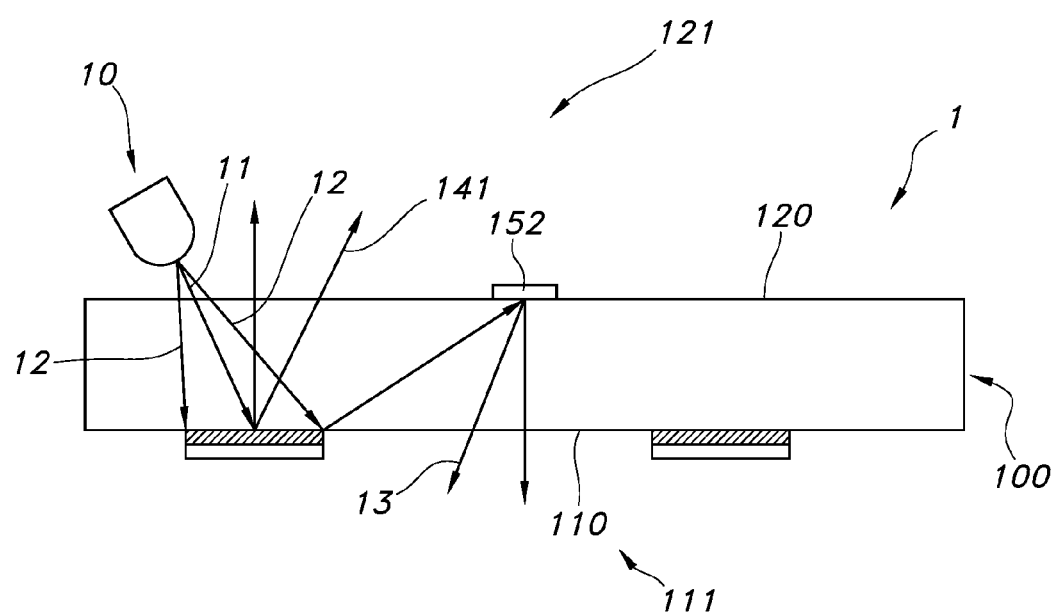

FIG. 3k schematically depicts an embodiment of the lighting unit 1, wherein the first light exit surface 110 comprises a plurality of first luminescent material domains 142 comprising the first luminescent material 14, which cover part of the first light exit surface 110, with downstream of each first luminescent material domain 142 a first reflector 151. The first luminescent material domains 142 are configured to generate first luminescent material light 141. The second light exit surface 120 comprises switchable luminescent layer system 300 comprising a second luminescent material layer 240 comprising the second luminescent material 24, which (switchable luminescent layer system 300) covers the second light exit surface 120, with downstream of the switchable luminescent layer system 300 a plurality of second reflectors 152, which cover part of the switchable luminescent layer system 300. The second luminescent material layer 240 is configured to generate second luminescent material light 241. The first luminescent material domains 142 and the first reflectors 151 are configured to couple at least part of the first luminescent material light 141 out of the waveguide 100 in a direction away from the second light exit surface 120, wherein the switchable luminescent layer system 300 is transmissive for at least part of the first luminescent material light 141. The switchable luminescent layer system 300 is switchable between a first state with a low intensity of the luminescent material light 241 and a second state with a high intensity of the luminescent material light 241. As will be clear to the person skilled in the art, instead of or in addition to the switchable luminescent layer system 300 at the second light exit surface 120, such system may (also) be present at the first light exit surface 110.

The coverage of the first luminescent material domains 142 of the first light exit surface 110 surface may for instance be in the range of 0.1-75% of the surface area, such as 1-50%. Especially, first reflectors 151 cover the entire (respective) first luminescent material domains 142, but do not extend beyond the entire (respective) first luminescent material domains 142. The coverage of the luminescent layer system 300 of the second light exit 120 may be substantially 100% of the surface area, such as at least 95%, especially at least 99%. The coverage of the second luminescent material domains 242 of the luminescent layer system 300 may for instance be in the range of 0.1-75% of the surface area, such as 1-50%.

Especially, the first and second luminescent materials 14,24 are different.

Note that in a specific embodiment, the second luminescent material 24 may be excitable also by the first luminescent material light 141. In a specific embodiment, instead of being excitable by the (outcoupled) light source light 13, the second luminescent material is excitable by the first luminescent material light 141.

Hence, in another embodiment, we suggest a waveguide comprising a plurality of first reflectors comprising luminescent material being arranged on a first side and a switchable luminescent layer being arranged on a second side. Such a switchable luminescent layer can be for instance a Polymer Dispersed Liquid Crystal (PDLC) element comprising a luminescent material or Liquid Crystal gel (LC-gel) comprising a luminescent material, an electro wetting device comprising a luminescent material, or an in-plain switching electrophoretic device comprising a luminescent material In operation, light source light 11 enters via the edge 130 (or alternatively or additional via one or more of the first light exit surface 110 and the second light exit surface 120) of the waveguide 100 the waveguide, providing thereby (incoupled) light source light 12. Part of this (incoupled) light source light 12 is converted by the first luminescent material domains 142 into first luminescent material light 141, and coupled out of the waveguide 100 via second light exit surface 120, and is at least partly transmitted through the luminescent layer system 300 (in a first and a second state), thereby providing second light 121, which may partly consist of first luminescent material light 141. In a first state (here indicated with U=0V in case of a PDLC device comprising a luminescent material), part of this (incoupled) light source light 12 is converted by the second luminescent material layer 240 into second luminescent material light 241, reflected by the (downstream) second reflectors 152 in a direction of the first light exit surface 110, and coupled out of the waveguide 100 via first light exit surface 110, thereby providing first light 111, which may essentially consist of second luminescent material light 241; part of the second luminescent material light 241 may escape from the luminescent layer system 300 in a direction away from the second surface 120, thereby providing second light 121, which may also partly consist of second luminescent material light 241. In a second state (here indicated with U=V in case of a PDLC device comprising a luminescent material), part of this (incoupled) light source light 12 is at least partly transmitted by the second luminescent material layer 240, reflected by the (downstream) second reflectors 152 in a direction of the first light exit surface 110, and coupled out of the waveguide 100 via first light exit surface 110, thereby providing first light 111, which may essentially consist of (outcoupled) light source light 13. Hence, the following may be provided:

|  | Outcoupled light source light 13 | First luminescent material light 141 | Second luminescent material light 241 |
| --- | --- | --- | --- |
| First light 111 | (X) |  | (X) |
| Second light 121 |  | X | (X) |

Note that the switching characteristics may differ for the different electro-optical devices, e.g. U=0V PDLC light conversion state, U=0V PDLC light transparent state; U=0V LC gel light transparent state, U=0V LC gel light conversion state.

The embodiments schematically depicted in FIGS. 3a-3k may in some instance also be combined. For instance, two or more of embodiments schematically depicted in FIGS. 3a, 3b, 3c, 3i and 3j may be combined; or, two or more of embodiments schematically depicted in FIGS. 3d and 3e may be combined, etc.

Amongst others with the above described embodiments, it may be possible to provide for instance the first light 111 having a CCT of 4000K and the second light 121 having a CCT of 2700K. In another example, the first light 111 has a CCT of 3000K and the second light 121 has a CCT of 5000K. In a preferred embodiment, first light 111 and/or the second light 121 have a color point close to a black body line in the a color space (e.g. CIE xyz color space). In another preferred embodiment first light 111 and/or the second light 121 have a color point close to a black body line in the a color space (e.g. CIE xyz color space) and which has a CRI larger than 80. Close may especially imply within about 15 SDCM (standard deviation of color matching) from the BBL (black body locus), especially within about 10 SDCM from the BBL, even more especially within about 5 SDCM from the BBL.

The invention claimed is:
1. A lighting unit comprising (a) a waveguide, the waveguide comprising a first light exit surface, a second light exit surface configured opposite of the first light exit surface, and an edge, the lighting unit further comprising (b) a light source, configured for lighting the waveguide (100) with light source light, thereby providing incoupled light source light within the waveguide, wherein the lighting unit is further configured to allow part of the incoupled light source light to escape from the waveguide at one or more of the first light exit surface and the second light exit surface as outcoupled light source light, wherein the lighting unit further comprises (c) one or more of a first luminescent material adjacent to the first light exit surface and configured to provide first luminescent material light, and a second luminescent material adjacent to the second light exit surface and configured to provide second luminescent material light, wherein the first luminescent material and the second luminescent material are excitable by the outcoupled light source light, wherein the lighting unit is configured to provide during operation first light emanating from the lighting unit in a direction away from the first light exit surface and second light emanating from the lighting unit in a direction away from the second light exit surface, the first light comprising contributions of one or more of (i) the outcoupled light source light and (ii) one or more of the first luminescent material light and the second luminescent material light, the second light comprising contributions of one or more of (iii) the outcoupled light source light and (iv) one or more of the first luminescent material light and the second luminescent material light, the first light having a first spectral distribution, the second light having a second spectral distribution, wherein the first spectral distribution and second spectral distribution differ, wherein the lighting unit further comprises one or more of a plurality of first reflectors and a plurality of second reflectors, wherein the first light exit surface comprises a plurality of first reflectors, which cover part of the first light exit surface, wherein the lighting unit further comprises a first luminescent material layer comprising the first luminescent material configured downstream of the first light exit surface, wherein the first luminescent material layer is configured to generate first luminescent material light, and wherein the plurality of first reflectors are configured between the first light exit surface and the first luminescent material layer, wherein the second light exit surface comprises a plurality of second reflectors, which cover part of the second light exit surface, wherein the first reflectors are configured to couple at least part of the incoupled light source light out of the waveguide in a direction away from the second light exit surface, and wherein the second reflectors are configured to direct at least part of the incoupled light source light to the first luminescent material layer and to provide outcoupled light source light at the first light exit surface, and wherein the first luminescent material layer is transmissive for part of the outcoupled light source light, wherein the first light exit surface comprises a plurality of first luminescent material domains comprising the first luminescent material and a plurality of first reflectors, wherein the first luminescent material domains and the plurality of first reflectors cover part of the first light exit surface, wherein the second light exit surface comprises a plurality of second luminescent material domains comprising the second luminescent material and a plurality of second reflectors, wherein the second luminescent material domains and the plurality of second reflectors cover part of the second light exit surface, wherein the lighting unit comprises first couples of first reflectors and second luminescent material domains, with for each first couple the first reflector and second luminescent material domain configured opposite of each other with the waveguide in between, and wherein the lighting unit comprises second couples of second reflectors and first luminescent material domains, with for each second couple the second reflector and first luminescent material domain configured opposite of each other with the waveguide in between, wherein the first light exit surface comprises a plurality of first luminescent material domains comprising the first luminescent material, which cover part of the first light exit surface, with downstream of each first material domain a first reflector, wherein the first luminescent material domains are configured to generate first luminescent material light, wherein the second light exit surface comprises switchable luminescent layer system comprising a second luminescent material layer comprising the second luminescent material, which covers the second light exit surface, with downstream of the switchable luminescent layer system a plurality of second reflectors, which cover part of the switchable luminescent layer system, wherein the second luminescent material layer is configured to generate second luminescent material light, wherein the first luminescent material domains and the first reflectors are configured to couple at least part of the first luminescent material light out of the waveguide in a direction away from the second light exit surface, wherein the switchable luminescent layer system is transmissive for at least part of the first luminescent material light, and wherein the switchable luminescent layer system is switchable between a first state with a low intensity of the luminescent material light and a second state with a high intensity of the luminescent material light.

2. The lighting unit according to claim 1, wherein the first light and the second light have different color temperatures.

3. The lighting unit according to claim 1, wherein one or more of (a) the first light exit surface comprises a first luminescent material layer comprising the first luminescent material, and (b) the second light exit surface comprises a second luminescent material layer comprising the second luminescent material, and wherein one or more of the following conditions apply: (1) the first luminescent material layer and the second luminescent material layer differ in luminescent material, (2) the first luminescent material layer and the second luminescent material layer differ in luminescent material distribution, (3) the first luminescent material layer and the second luminescent material layer differ in luminescent material content, and (4) the first luminescent material layer and the second luminescent material layer differ in layer thickness (d).

4. The lighting unit according to claim 1, wherein the first light exit surface comprises a plurality of first luminescent material domains comprising the first luminescent material, which cover part of the first light exit surface, with downstream of each first luminescent material domain a first reflector, wherein the first luminescent material domains are configured to generate first luminescent material light, and wherein the first plurality of reflectors are configured to couple at least part of the first luminescent material light out of the waveguide in a direction away from the second light exit surface, wherein the second light exit surface comprises a plurality of second reflectors, which cover part of the second light exit surface, and which are configured to couple at least part of the incoupled light source light out of the waveguide as outcoupled light source light in a direction away from the first light exit surface.

5. The lighting unit according to claim 1, wherein the first light exit surface comprises a plurality of first luminescent material domains comprising the first luminescent material, which cover part of the first light exit surface, with downstream of each first luminescent material domain a plurality of first reflectors, wherein the first luminescent material domains are configured to generate first luminescent material light), and wherein the plurality of first reflectors are configured to couple at least part of the first luminescent material light out of the waveguide in a direction away from the second light exit surface, wherein the second light exit surface comprises a plurality of second luminescent material domains comprising the second luminescent material, which cover part of the second light exit surface, with downstream of each second luminescent material domain a plurality of second reflectors, wherein the second luminescent material domains are configured to generate second luminescent material, wherein the plurality of second reflectors are configured to couple at least part of the second luminescent material light out of the waveguide in a direction away from the first light exit surface, and wherein the first light exit surface and second light exit surface differ in coverage with the first luminescent material domains and second luminescent material domains, respectively.

6. The lighting unit according to claim 1, wherein the first light exit surface comprises a plurality of first luminescent material domains comprising the first luminescent material, which cover part of the first light exit surface, with downstream of each first luminescent material domain a first reflector, wherein the first luminescent material domains are configured to generate first luminescent material light, and wherein the plurality of first reflectors are configured to couple at least part of the first luminescent material light (141) out of the waveguide in a direction away from the second light exit surface, wherein the second light exit surface comprises a plurality of second luminescent material domains comprising the second luminescent material, which cover part of the second light exit surface, with downstream of each second luminescent material domain a plurality of second reflectors, wherein the second luminescent material domains are configured to generate second luminescent material, wherein the plurality of second reflectors are configured to couple at least part of the second luminescent material light out of the waveguide in a direction away from the first light exit surface, and wherein the first luminescent material domains and the second luminescent material domains differ in luminescent material.

7. The lighting unit according to claim 1, wherein the first light exit surface comprises a plurality of first reflectors, which cover part of the first light exit surface, wherein the second light exit surface comprises a second luminescent material layer comprising the second luminescent material, which covers the second light exit surface, wherein the second luminescent material layer is configured to generate second luminescent material light, wherein the first reflectors are configured to direct at least part of the incoupled light source light to the second luminescent material layer and to provide outcoupled light source light at the second light exit surface, and wherein the second luminescent material layer is transmissive for part of the outcoupled light source light.

8. The lighting unit according to claim 1, wherein the first light exit surface comprises a plurality of first luminescent material domains comprising the first luminescent material, which cover part of the first light exit surface, with downstream of each first luminescent material domain a first reflector, wherein the first luminescent material domains are configured to generate first luminescent material light, wherein the second light exit surface comprises a second luminescent material layer comprising the second luminescent material, which covers the second light exit surface, wherein the second luminescent material layer is configured to generate second luminescent material light, wherein the first luminescent material domains and the first reflectors are configured to couple at least part of the first luminescent material light out of the waveguide in a direction away from the second light exit surface, and wherein the second luminescent material layer is transmissive for at least part of the first luminescent material light.

9. The lighting unit according to claim 1, wherein the first light exit surface comprises a plurality of first reflectors, which cover part of the first light exit surface, wherein the lighting unit further comprises a first luminescent material layer comprising the first luminescent material configured downstream of the first light exit surface, wherein the first luminescent material layer is configured to generate first luminescent material light, and wherein the plurality of first reflectors are configured between the first light exit surface and the first luminescent material layer, wherein the second light exit surface comprises a plurality of second reflectors, which cover part of the second light exit surface, wherein the lighting unit further comprises a second luminescent material layer comprising the second luminescent material configured downstream of the second light exit surface, wherein the second luminescent material layer is configured to generate second luminescent material light, and wherein the plurality of second reflectors are configured between the second light exit surface and the second luminescent material layer, wherein the first reflectors are configured to direct at least part of the incoupled light source light to the second luminescent material layer and to provide outcoupled light source light at the second light exit surface, and wherein the second luminescent material layer is transmissive for part of the outcoupled light source light, and wherein the second reflectors are configured to direct at least part of the incoupled light source light to the first luminescent material layer and to provide outcoupled light source light at the first light exit surface, and wherein the first luminescent material layer is transmissive for part of the outcoupled light source light.

10. The lighting unit according to claim 1, wherein the first light exit surface comprises a first luminescent material layer (140) comprising the first luminescent material, which covers the first light exit surface, wherein the first luminescent material layer is configured to generate first luminescent material light, wherein the second light exit surface comprises a plurality of second reflectors, which cover part of the second light exit surface, wherein the lighting unit further comprises a second luminescent material layer comprising the second luminescent material configured downstream of the second light exit surface, wherein the second luminescent material layer is configured to generate second luminescent material light, and wherein the plurality of second reflectors are configured between the second light exit surface and the second luminescent material layer, wherein the second reflectors are configured to direct at least part of the incoupled light source light to the first luminescent material layer and to provide outcoupled light source light at the first light exit surface, and wherein the first luminescent material layer is transmissive for part of the outcoupled light source light, and wherein the first luminescent material layer is configured to direct at least part of the incoupled light source light to the second luminescent material layer, and wherein the second luminescent material layer is transmissive for part of the incoupled light source light.

11. The lighting unit according to claim 1, wherein the light source comprises a light emitting device and wherein the light source light comprises blue light.

12. A method of providing first light having a first spectral distribution and second light having a second spectral distribution emanating from a waveguide in different directions, wherein the first spectral distribution and second spectral distribution differ, comprising providing a lighting unit according to any one of the preceding claims and introducing light source light in the waveguide.

* * * * *